US008630892B2

(12) United States Patent (10) Patent No.: US 8,630,892 B2
Bhalla et al. (45) Date of Patent: Jan. 14, 2014

(54) CHURN ANALYSIS SYSTEM

(75) Inventors: Anuj Bhalla, Lake Hopatcong, NJ (US);
Vukieali Amonju, Houston, TX (US);
Terry Lynn Walls, Duluth, GA (US);
Robert Wayne Honts, Austin, TX (US);
Matthew Dean Logering, Bloomington, MN (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/436,482

(22) Filed: Mar. 30, 2012

(65) Prior Publication Data

US 2013/0054306 A1 Feb. 28, 2013

Related U.S. Application Data

(60) Provisional application No. 61/529,747, filed on Aug. 31, 2011.

(51) Int. Cl.
*G06Q 10/00* (2012.01)

(52) U.S. Cl.
USPC .......................................................... 705/7.31

(58) Field of Classification Search
USPC ................................................ 705/7.29, 7.31
See application file for complete search history.

(56) References Cited

U.S. PATENT DOCUMENTS

| | | | | |
|---|---|---|---|---|
| 6,014,647 | A * | 1/2000 | Nizzari et al. .................. | 705/39 |
| 6,470,335 | B1 | 10/2002 | Marusak | |
| 7,340,408 | B1 * | 3/2008 | Drew et al. ................... | 705/7.33 |
| 7,353,182 | B1 * | 4/2008 | Missinhoun et al. ........ | 705/7.12 |
| 7,698,163 | B2 | 4/2010 | Reed et al. | |
| 7,813,952 | B2 * | 10/2010 | Eskandari ..................... | 705/7.31 |
| 8,199,901 | B2 * | 6/2012 | Rani et al. ................ | 379/265.03 |
| 8,468,061 | B2 * | 6/2013 | Sharma ........................ | 705/26.1 |
| 2002/0072957 | A1 * | 6/2002 | Thompson et al. ............. | 705/10 |
| 2004/0073520 | A1 | 4/2004 | Eskandari | |
| 2005/0198556 | A1 * | 9/2005 | Tripp et al. .................... | 714/726 |
| 2005/0209910 | A1 * | 9/2005 | Selby .............................. | 705/10 |
| 2007/0127692 | A1 | 6/2007 | Varadarajan et al. | |
| 2007/0156673 | A1 * | 7/2007 | Maga et al. ....................... | 707/5 |
| 2007/0185867 | A1 | 8/2007 | Maga et al. | |
| 2009/0222313 | A1 | 9/2009 | Kannan et al. | |
| 2009/0292583 | A1 * | 11/2009 | Eilam et al. ..................... | 705/10 |
| 2010/0318400 | A1 * | 12/2010 | Geffen et al. ..................... | 705/9 |

(Continued)

FOREIGN PATENT DOCUMENTS

WO   WO 2011/112173   9/2011

OTHER PUBLICATIONS

Hadden et al., Computer Assisted Customer Churn Management: State-of-the-Art and Future Trends, Oct. 2007, Computers & Operations Research, vol. 34, Isue 10, pp. 2902-2917.*

(Continued)

*Primary Examiner* — Jonathan G Sterrett
*Assistant Examiner* — Scott Ross
(74) *Attorney, Agent, or Firm* — Brinks Gilson & Lione

(57) ABSTRACT

A churn analysis system helps a business analyze, predict, and reduce customer churn. The system analyzes customer experiences by using an insightful block level approach to correlate customer experience with customer churn. Through the block level approach, the system is able to more accurately predict and effectively reduce future customer churn. As a result, businesses are able to reduce customer acquisition costs and improve customer retention rates.

18 Claims, 30 Drawing Sheets

910

| Block Index | Row Index | Row Index End | Customer Identifier | Date Time Stamp | Interaction ID | Agent ID | First Contact? | Resolved Contact? | Calls in Block | Agents in Block |
|---|---|---|---|---|---|---|---|---|---|---|
| 1 | 1 | 2 | AAAAAAA | 1/16/2011 12:35 | 10004 | Andy | 1 | 0 | 2 | 2 |
| | 2 | 2 | AAAAAAA | 1/18/2011 2:41 | 10006 | Mira | 0 | 1 | | |
| 2 | 3 | 3 | AAAAAAA | 1/28/2011 18:06 | 10007 | Steve | 1 | 1 | 1 | 1 |
| 3 | 4 | 4 | BBBBBBBB | 4/15/2011 12:07 | 10008 | Nick | 1 | 1 | 1 | 1 |
| 4 | 5 | 5 | CCCCCCC | 12/29/2010 9:45 | 10001 | Lisa | 1 | 1 | 1 | 1 |
| 5 | 6 | 8 | CCCCCCC | 1/9/2011 10:05 | 10002 | Lisa | 1 | 0 | 3 | 2 |
| | 7 | 8 | CCCCCCC | 1/12/2011 3:10 | 10003 | Andy | 0 | 0 | | |
| | 8 | 8 | CCCCCCC | 1/17/2011 9:47 | 10005 | Lisa | 0 | 1 | | |

(56) References Cited

U.S. PATENT DOCUMENTS

| | | | |
|---|---|---|---|
| 2011/0218955 A1* | 9/2011 | Tang et al. | 706/52 |
| 2011/0295649 A1* | 12/2011 | Fine et al. | 705/7.29 |
| 2012/0053990 A1* | 3/2012 | Pereg et al. | 705/7.31 |
| 2013/0124258 A1* | 5/2013 | Jamal et al. | 705/7.29 |

OTHER PUBLICATIONS

K. Coussement & D. Van Den Poel, 2008. "Improving Customer Attrition Prediction by Integrating Emotions from Client/Company Interaction Emails and Evaluating Multiple Classifiers," Working Papers of Faculty of Economics and Business Administration, Belguim 08/527, Ghent University, Faculty of Economics and Business Administration.*

K. Coussement & D. Van Den Poel, 2008, "Integrating the Voice of Customers through Call Center Emails into a Decision Support System for Churn Prediction," Working Papers of Faculty of Economics and Business Administration, Ghent University, Belguim 08/502, Ghent Univeristy, Faculty of Economics and Business Administration.*

V. L. Migueis & D. Van Den Poel & A.S. Cananho & J. Falcao E Cunha, 2012, "Modeling Partial Customer Churn: On the Value of First Product-Category Purchase Sequences," Working Papers of Faculty of Economics and Business Administration, Ghent University, Belguim 12/790, Ghent University, Faculty of Economics and Business Administration.*

Patent Examination Report No. 1 Australian Patent Application No. 2012216525 dated Oct. 22, 2012.

Patent Examination Report No. 2 in Australian Patent Application No. 2012216525 dated Oct. 2, 2013.

* cited by examiner

UNIFIED SERVICE ANALYTIC RECORD

| Customer Experience Block ID 901 | Customer Identifier 902 | Date Time Stamp 903 | First Contact? 904 | Resolved Contact? 905 |
|---|---|---|---|---|
| 0001 | AAAAAAA | 27-Jul-2010 12:35:17 | Yes | No |
| 0002 | AAAAAAA | 29-Jul-2010 02:41:18 | No | Yes |
| 0002 | AAAAAAA | 08-Aug-2010 18:06:10 | Yes | Yes |
| 0003 | BBBBBBB | 15-Apr-2010 12:07:01 | Yes | Yes |
| 0004 | CCCCCCC | 29-Dec-2010 09:45:35 | Yes | Yes |
| 0005 | CCCCCCC | 09-Jan-2011 10:05:21 | Yes | No |
| 0005 | CCCCCCC | 12-Jan-2011 03:10:51 | No | No |
| 0005 | CCCCCCC | 17-Jan-2011 09:47:51 | No | Yes |

| Customer Identifier | Date Time Stamp | Interaction ID |
|---|---|---|
| CCCCCCC | 12/29/2010 9:45 | 10001 |
| CCCCCCC | 1/9/2011 10:05 | 10002 |
| CCCCCCC | 1/12/2011 3:10 | 10003 |
| AAAAAAA | 1/16/2011 12:35 | 10004 |
| CCCCCCC | 1/17/2011 9:47 | 10005 |
| AAAAAAA | 1/18/2011 2:41 | 10006 |
| AAAAAAA | 1/24/2011 18:06 | 10007 |
| BBBBBBBB | 4/15/2011 12:07 | 10008 |

Sort records by customer ID and chronologically

910

| Row Index | Customer Identifier | Date Time Stamp | Interaction ID |
|---|---|---|---|
| 1 | AAAAAAA | 1/16/2011 12:35 | 10004 |
| 2 | AAAAAAA | 1/18/2011 2:41 | 10006 |
| 3 | AAAAAAA | 1/24/2011 18:06 | 10007 |
| 4 | BBBBBBBB | 4/15/2011 12:07 | 10008 |
| 5 | CCCCCCC | 12/29/2010 9:45 | 10001 |
| 6 | CCCCCCC | 1/9/2011 10:05 | 10002 |
| 7 | CCCCCCC | 1/12/2011 3:10 | 10003 |
| 8 | CCCCCCC | 1/17/2011 9:47 | 10005 |

Figure 9b

| Block Index | Row Index | Row Index End | Customer Identifier | Date Time Stamp | Interaction ID | Agent ID | First Contact? | Resolved Contact? | Calls in Block | Agents in Block |
|---|---|---|---|---|---|---|---|---|---|---|
| 1 | 1 | 2 | AAAAAAA | 1/16/2011 12:35 | 10004 | Andy | 1 | 0 | 2 | 2 |
|   | 2 | 2 | AAAAAAA | 1/18/2011 2:41 | 10006 | Mira | 0 | 1 |   |   |
| 2 | 3 | 3 | AAAAAAA | 1/28/2011 18:06 | 10007 | Steve | 1 | 1 | 1 | 1 |
| 3 | 4 | 4 | BBBBBBB | 4/15/2011 12:07 | 10008 | Nick | 1 | 1 | 1 | 1 |
| 4 | 5 | 5 | CCCCCCC | 12/29/2010 9:45 | 10001 | Lisa | 1 | 1 | 1 | 1 |
| 5 | 6 | 8 | CCCCCCC | 1/9/2011 10:05 | 10002 | Lisa | 1 | 0 | 3 | 2 |
|   | 7 | 8 | CCCCCCC | 1/12/2011 3:10 | 10003 | Andy | 0 | 0 |   |   |
|   | 8 | 8 | CCCCCCC | 1/17/2011 9:47 | 10005 | Lisa | 0 | 1 |   |   |

Figure 9d

CHURN ANALYSIS SYSTEM

CLAIM OF PRIORITY

This application claims the benefit of U.S. Provisional Patent Application Ser. No. 61/529,747, filed Aug. 31, 2011, which is incorporated by reference in its entirety herein.

TECHNICAL FIELD

This disclosure relates to analyzing, predicting, and reducing customer churn. In particular, this disclosure relates to analyzing customer experience, determining customer churn, and correlating customer experience with customer churn to predict and reduce future customer churn.

RELATED ART

Customers may interact with service providers across a variety of channels, including, for example, call centers, retail stores, web sites, email, social media, and self-service technology (such as interactive voice response). A customer's experience through any one, or any combination, of these channels often affects the customer's overall satisfaction with the service provider. Customer satisfaction, in turn, determines whether the customer will look for alternative service providers, or continue to stay with the current service provider. Because the cost of retaining customers is much lower than the cost of acquiring new customers, service providers have a strong incentive to develop programs and incentives aimed at retaining customers. Service providers are constantly looking for effective tools to understand their customers, improve customer retention rates, reduce customer acquisition costs, and boost market share. Not all customers have the same propensity to churn. By identifying customers who are most likely to churn, service providers may reduce customer retention costs and develop customer retention programs and incentives that have the highest impact at the lowest cost.

Service providers need to be able to identify and address root causes of customer attrition and apply targeted treatment strategies to improve the customer experience. The root causes of customer churn can be hard to trace. The causes may lie virtually anywhere, for example buried in negative experiences associated with any one of multiple interactions. In order to improve and sustain customer retention rates over time, companies must improve the customer experience of all these interactions. But in enterprises where customers have millions of monthly interactions, across a variety of channels, it is difficult to identify all the interactions. It may be even more difficult to determine which interactions drive churn, especially when customer interaction data records are usually contained in different systems that do not communicate with one another and are collected in varying data formats.

In today's highly competitive market, customers do not hesitate to switch providers to find the most competitive pricing, the best value for their money, and high quality service. The development of social media as the ultimate word-of-mouth communication has greatly increased the speed and magnitude of influence of individual switching decisions. In other words, one customer's decision to switch providers may influence more customers and more quickly through today's many channels of social media. Moreover, in many industries, customers perceive very few barriers to switching in their constant quest for differentiated offerings.

A need has long existed to address the problems noted above and others previously experienced.

SUMMARY

A churn analysis system collects cross-channel customer experience data, correlates cross-channel customer experience data with customer churn, and determines a customer's propensity to churn based on the correlations. The system collects customer interaction data for each customer interaction between an individual customer and a service provider. The system tracks churn data, such as date and time of churn, for the individual customer and creates customer experience blocks from the customer interaction data. The system further stores the customer experience blocks in unified service analytic records and determines correlations between customer churn and customer interaction data. Based on the correlations, the system determines customer propensity to churn based on the customer's interaction data. The system may measure propensity to churn as, for example, a Customer Churn Index (CCI). In this way, the system predicts the customer's propensity to churn before the churn occurs and identifies opportunities for retaining customers. Using the propensity to churn measure, a service provider may monitor an average or total customer churn rate to determine effectiveness of churn reduction initiatives.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
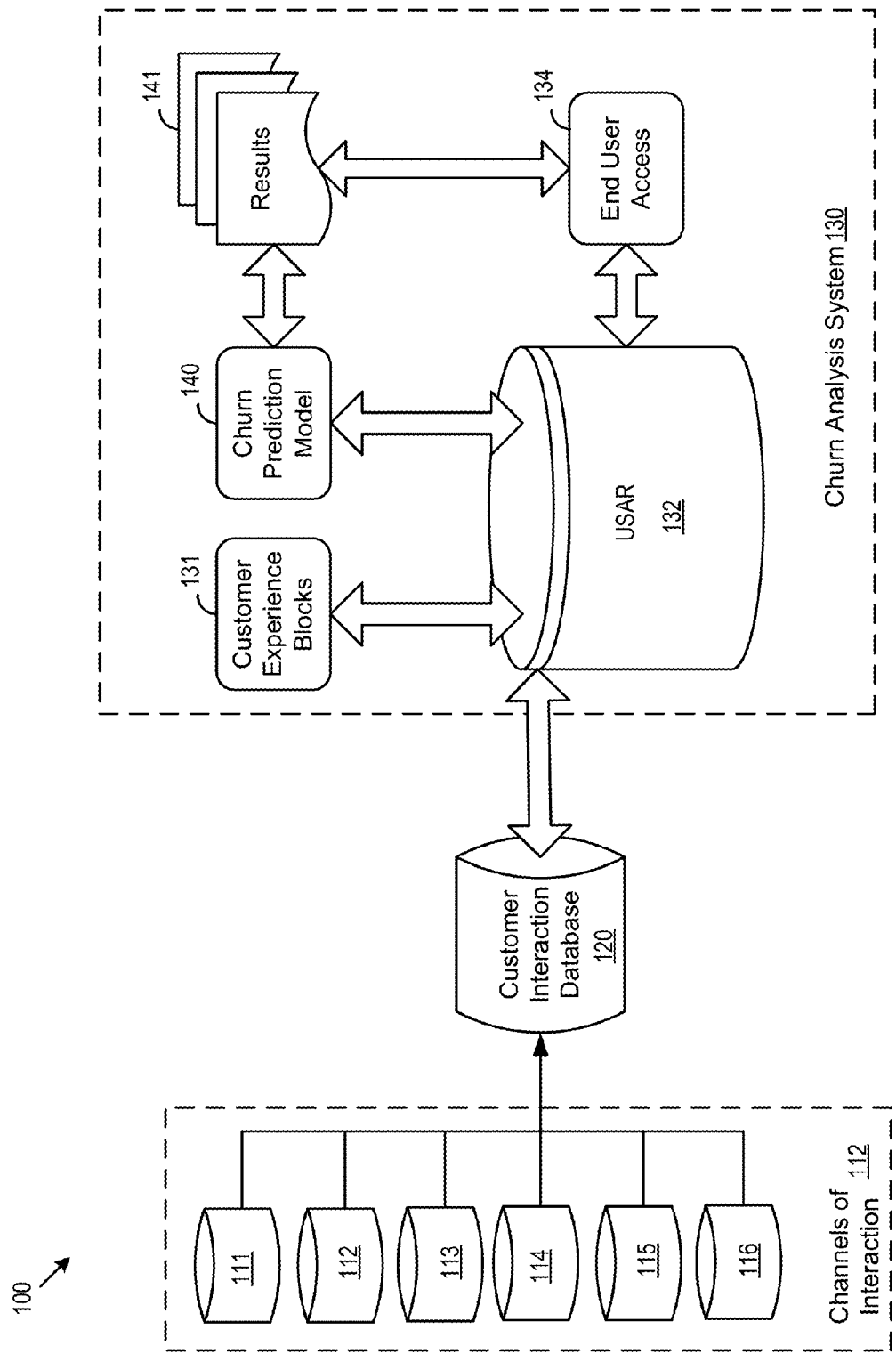
FIG. 1 shows a technical architecture that includes a churn analysis system.

FIG. 1 shows a churn analysis technical architecture 100 including a plurality of channels of interaction 110, which may include, for example, retail stores 111, call centers 112, web 113, email 114, social media 115, and self-service channels 116. A customer may choose to interact with a service provider through any combination of one or more channels of interaction supported by the service provider. The service provider may collect information from the channels of interaction and store the information as customer interaction data in a customer interaction database 120. A churn analysis system 130 may access the customer interaction database 120 through a network. The system 130 may complete cross-channel analysis of customer interaction data by analyzing customer interaction data across multiple channels of interaction. The system 130 may create customer experience blocks 131 from the customer interaction data, and save one or more customer experience blocks 131 to a unified service analytic record (USAR) 132. The system 130 may derive interaction metrics and block metrics from customer interaction attributes and customer experience block attributes, and submit the metrics to a churn prediction model 140. The churn prediction model 140 may analyze the interaction metrics and block metrics and provide churn analysis results 141. The system 130 may receive the churn analysis results 141 from the churn prediction model 140 and provide end user access 134 to the results 141.

Figure 2:
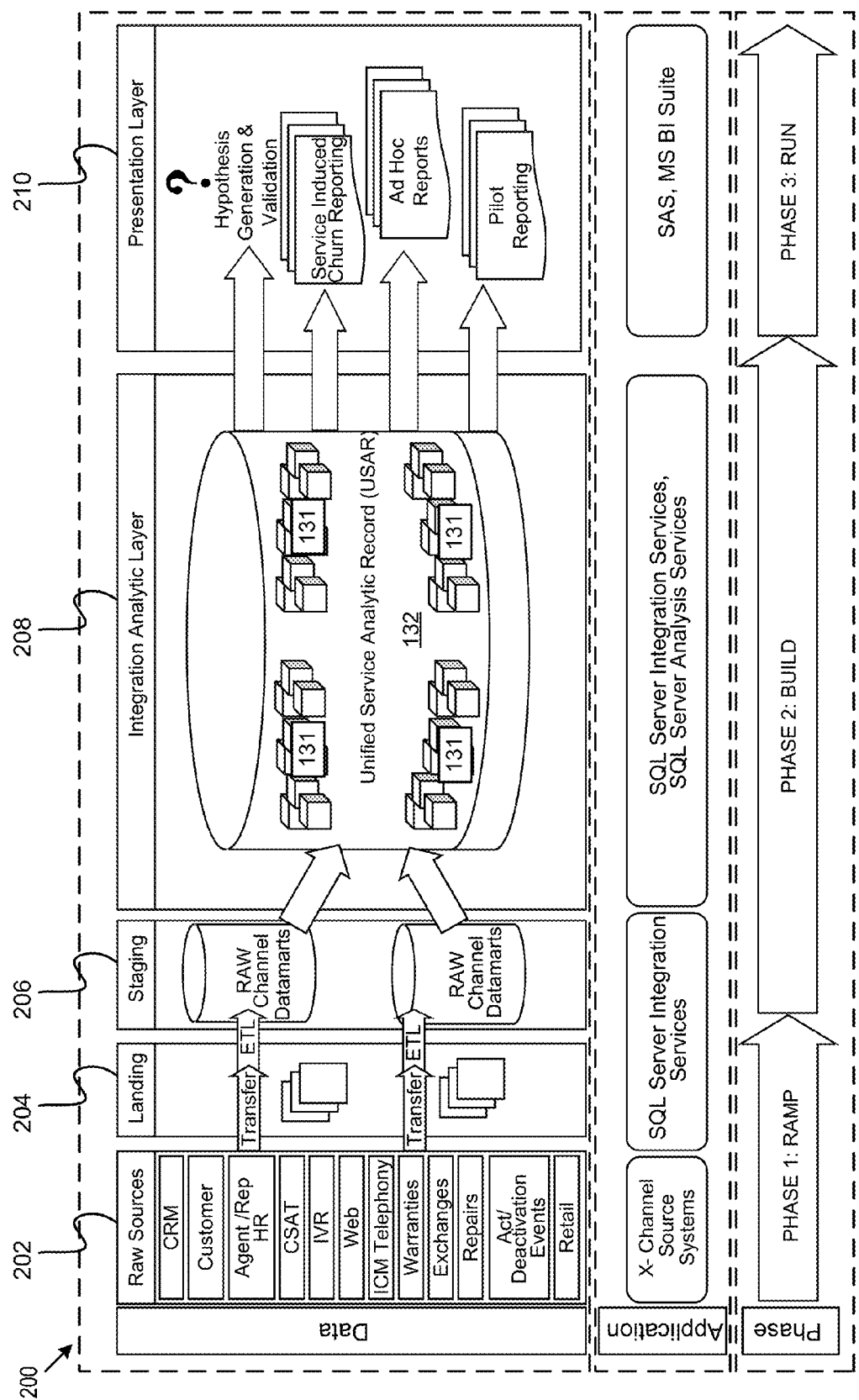
FIG. 2 shows a block diagram of a USAR dataflow and churn analysis system.

FIG. 2 shows an example implementation 200 of the churn analysis architecture 100. The architecture 200 provides a view of a customer's interactions with a service provider through one or more channels of interaction. The technical architecture 200 may include raw sources of data 202, a landing area 204, a staging area 206, an integration analytic layer 208, and a presentation layer 210.

A USAR may be a cross-channel customer experience data model that provides an end-to-end view of customers' experiences with a service provider. Customer experiences may include customer contacts, interactions, transactions, or other involvements with a service provider. The USAR may logically integrate data from disparate sources with clear relationships and intuitive ability to navigate. The USAR may integrate data from multiple systems into one environment. The USAR may enable determination of causal data from business results without multiple iterations of reporting requests, dramatically reducing the time required to research the true "why" of business results. The USAR may include cost data analysis, which may enable initiative prioritization based on true understanding of overall impact and costs (e.g. cost to serve, churn, etc.). The USAR may integrate cross-channel data to provide a centralized customer experience intelligence platform. The USAR may be a scaling and efficient solution to implement a customer churn index across an entire customer base, which will provide capability to automate a customer score basis.

The USAR may be a collection of one or more customer experience blocks. A customer experience block 131 may include a group of customer interaction data, ordered chronologically. Each customer experience block 131 may include a plurality of attributes describing the customer experience block and a plurality of attributes describing each of the customer interactions within the customer experience block.

Figure 3:
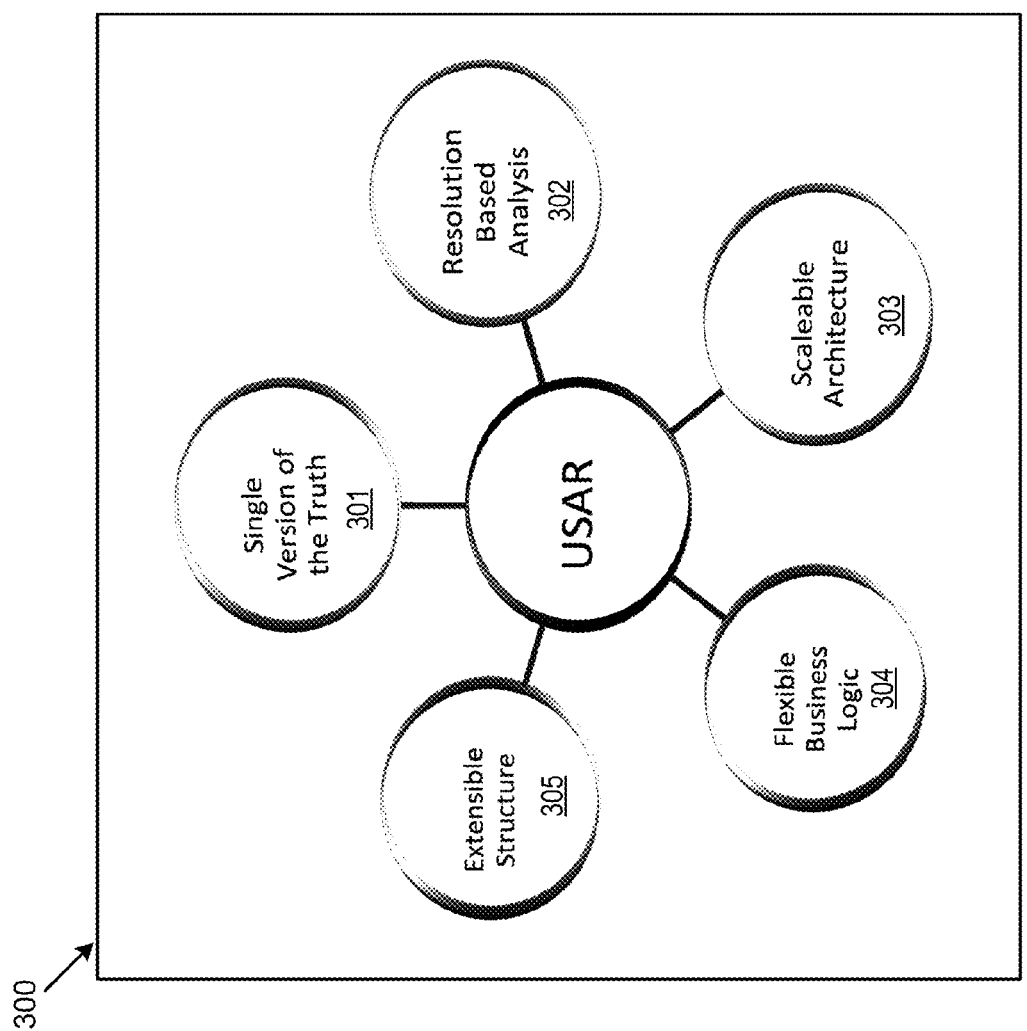
FIG. 3 shows a diagram of exemplary features of a USAR.

FIG. 3 shows exemplary features of a USAR 300. Features of a USAR 300 may include: single version of the truth 301 (e.g., a consistent, updated singular repository for data that ensures consistent, credible results for analyses); resolution-based analysis 302 (e.g., ability to evaluate the customer experience not just on a transaction level, but with visibility to customer touchpoints from the initial interaction to the final resolution of their issue); scaleable architecture 303 (e.g. the architecture can handle and process large volumes of customer touchpoints and transactions with consistent memory usage and processing performance); flexible business logic 304 (e.g., ability to handle several different logic schemas down to the transaction level to support different calculations of KPIs or metrics); and extensible structure 305 (e.g., the USAR can be quickly adapted to handle a line of business specific fields that are important and relevant to customers and/or operations being analyzed).

Voluntary churn ($C_V$) may be a function of Product Quality (Q), Price Sensitivity (P), and Customer Experience (E): $C_V=f(Q, P, E)$. The churn analysis system 130 may employ a data driven discovery approach to gain intelligence on customer pain points or dissatisfaction in their interactions with the service provider and prioritize hypotheses for pilots. Pilots may be, for example, proposed programs or initiatives designed to increase customer retention, or decrease churn. Pilots may be based, for example, on hypotheses regarding the effects of customer contacts and interactions on overall customer experience and customer propensity to churn. The system may also provide ongoing churn intelligence support to measure the effectiveness of pilots and their specific effects on voluntary churn and customer experience.

Figure 4:
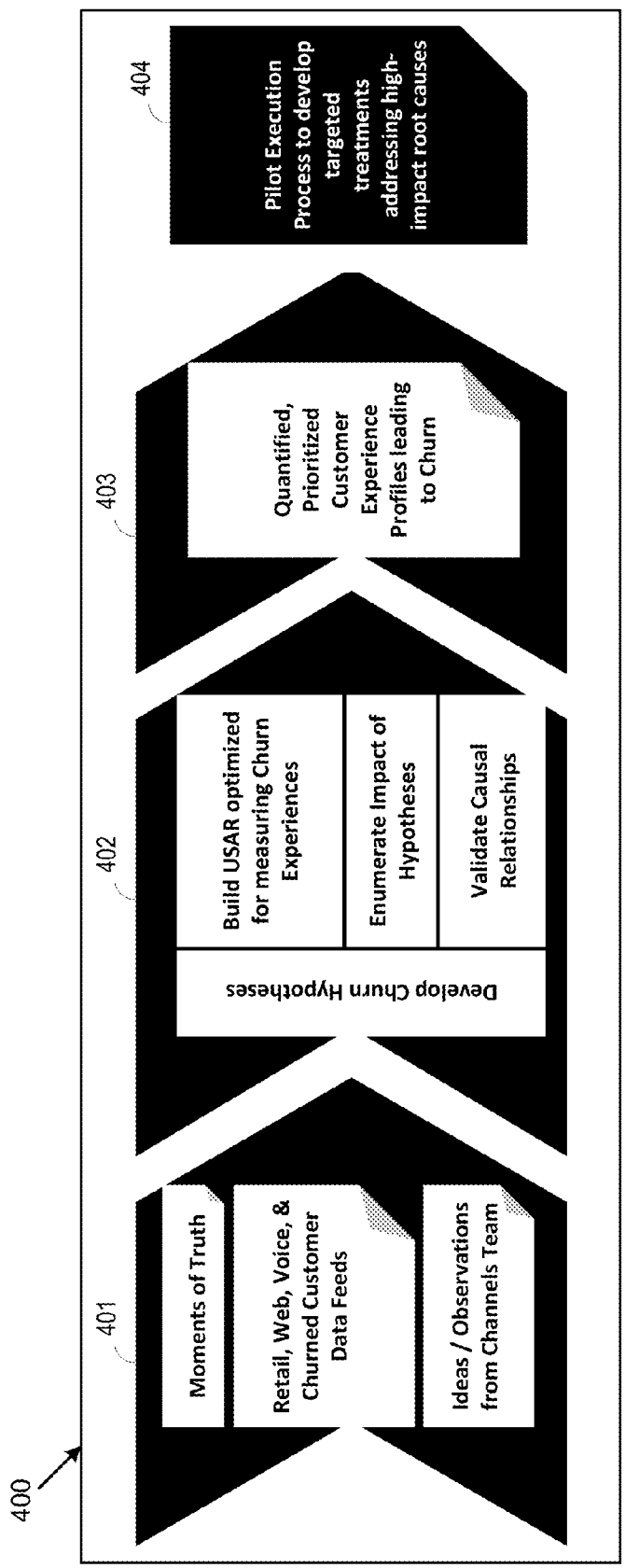
FIG. 4 shows a flow diagram of steps for identifying, quantifying and prioritizing customer experiences.

FIG. 4 shows a flow diagram 400 for identification, quantification, and prioritization of customer experiences that cause customers to churn. The churn analysis system 130 may identify, quantify, and prioritize customer experiences that cause customers to churn by collecting inputs 401, performing activities 402, and providing outputs 403. Collecting inputs 401 may include: collecting as-is moments of truth from customer interactions (e.g., through social media, such as customer posts on a service provider's (e.g., Facebook™ service) page) to understand and uncover painful experiences; gathering data across channels of interaction, including, for example, Retail, Web, and Voice; capturing comprehensive cross-channel information into a single repository; collecting ideas from other Channels Special Projects as well as first-hand observations; and agreeing on key dependencies with business and technology stakeholders. Performing activities 402 may include: developing hypotheses as to which customer experiences lead to churn and how to reduce churn; building and enhancing a USAR model using churned customer experiences; performing post-churn customer interaction analyses to help generate additional hypotheses; validating and quantifying the impact of hypotheses; and defining key business capabilities and alignment to benefit drivers. Providing outputs 403 may include: summarizing overall benefits for validated hypotheses in terms of retained customers; prioritizing and ordering hypotheses based on impact to customer base and likelihood to churn; and highlighting key decisions and assumptions for each customer experience profile or segment identified. A customer profile or segment may be designated, for example, based interaction attributes or metrics and block attributes or metrics that may be relevant to the hypotheses. The outputs 403 may be input to a Pilot Execution Process 404 to develop targeted treatments addressing high-impact root causes. Inputting the outputs to the Pilot Execution Process may support selection of initiatives based on business value and complexity levers; assist in determining target treatments to address target customer experiences causing churn; and measure efficacy of rolled-out pilots.

Figure 5:
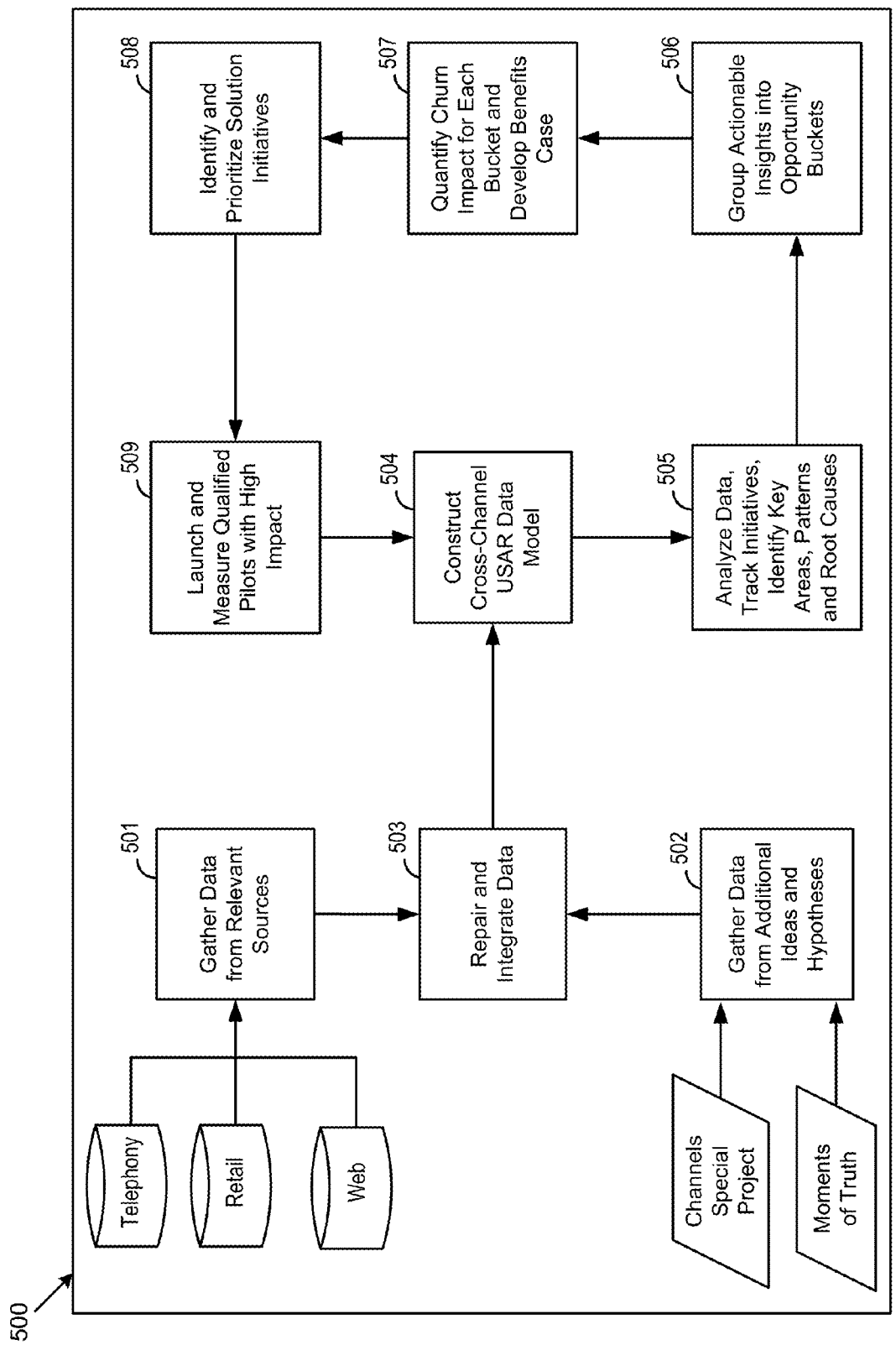
FIG. 5 shows a flow diagram of an implementation of a churn analysis system.

FIG. 5 shows a flow diagram of exemplary logic 500 that the churn analysis system 130 may implement for driving churn reduction initiatives from hypotheses to creation of pilots. At block 501, the system may receive data from relevant sources, such as telephony channel data, retail channel data, and web channel data. At block 502, the system may gather additional data from ideas and hypotheses regarding customer experiences that drive churn events (such as from channels special projects and moments of truth data). At block 503, the system may repair and integrate the data that were received and gathered at block 501 and block 502. At block 504, the churn analysis system 130 creates a cross-channel USAR data model, which may be optimized for measuring service impacts on churn. At block 505, the system analyzes customer interaction data across all disparate channels data sets, tracks pilot initiatives that are in progress, identifies key areas of churn or dissatisfaction for customers, identifies contact patterns via advanced interaction sequencing techniques, and identifies root causes for top churn drivers. At block 506, the system groups actionable insights into opportunity "buckets" and performs more in-depth and/or prioritized analyses. Outcomes from block 506 may include: correlate insights with churn events, review results, develop hypotheses, determine root causes, brainstorm solutions, and identify leading metrics that may be relevant to predicting churn. At block 507, the system may quantify churn impact for each bucket and develop a high-level benefits case. At block 508, the system may identify and prioritize solution initiatives. At block 509 the system may assist with launching and measuring qualified pilots to address high impact customer experiences or interactions leading to churn, and identify high impact churn initiatives to submit into the pilot process. Pilots may be qualified based on estimated time and resource requirements for implementing a roadmap of each pilot.

Figure 6:
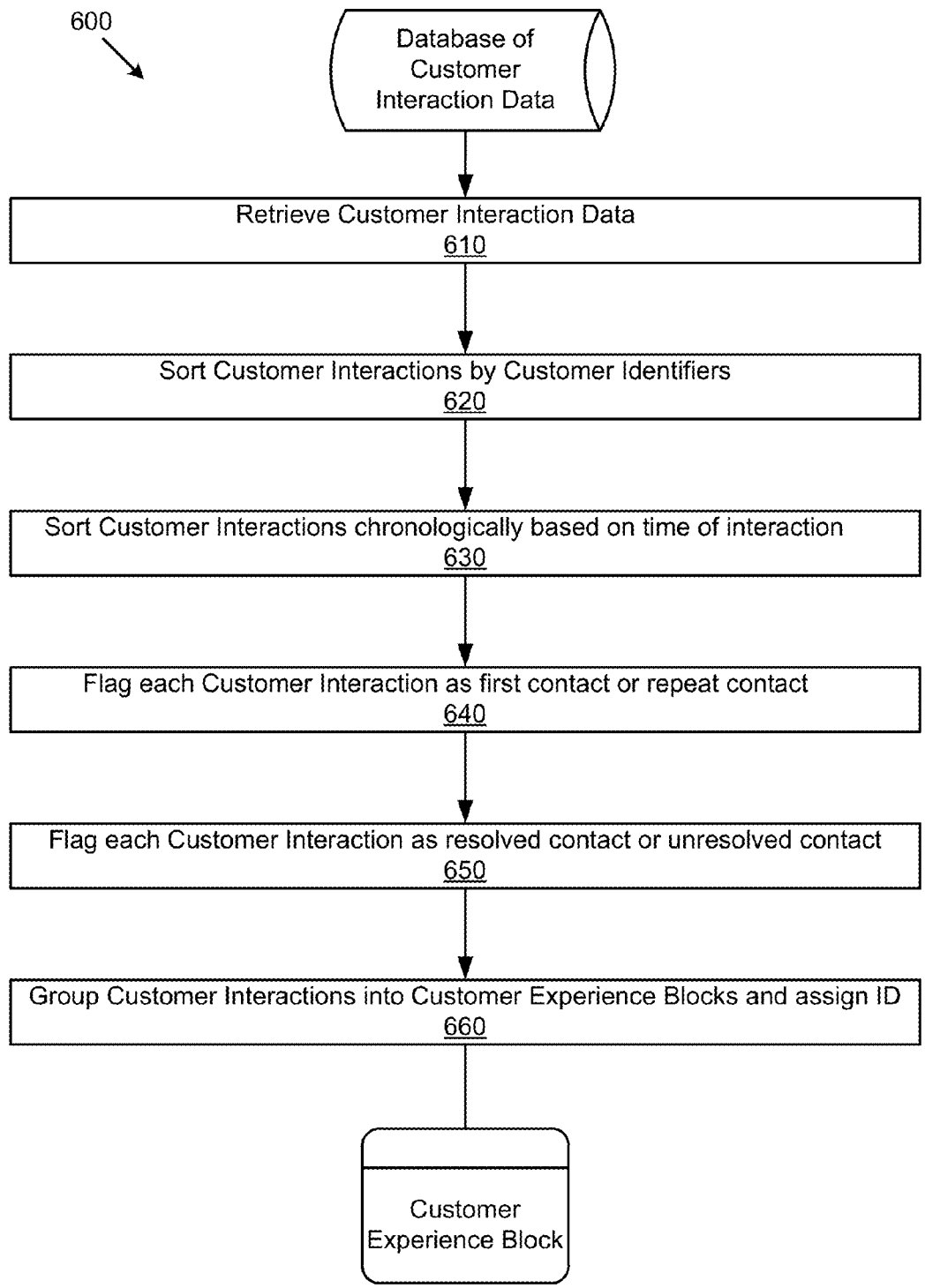
FIG. 6 shows a flow diagram of a method for creating customer experience blocks.

FIG. 6 shows a flow diagram of exemplary logic 600 that the churn analysis system 130 may implement for creating a customer experience block. The churn analysis system 130 may access the customer interaction database to retrieve customer interaction data at block 610, which may include information, such as customer identifier, date and time of an interaction, and unique identifier of the interaction, regarding customer interactions. The churn analysis system 130 may sort and group the customer interaction data according to customer identifiers at block 620, where each customer identifier is unique to a customer. The churn analysis system 130 may sort the customer interaction data for each customer identifier chronologically based on the date and time of the interactions at block 630. At block 650, the churn analysis system 130 may flag each customer interaction as a first contact or a repeat contact, and also as a resolved contact or an unresolved contact. The system may create customer experience blocks by grouping customer interactions and assigning a customer experience block ID to each group of customer interactions.

Figure 7:
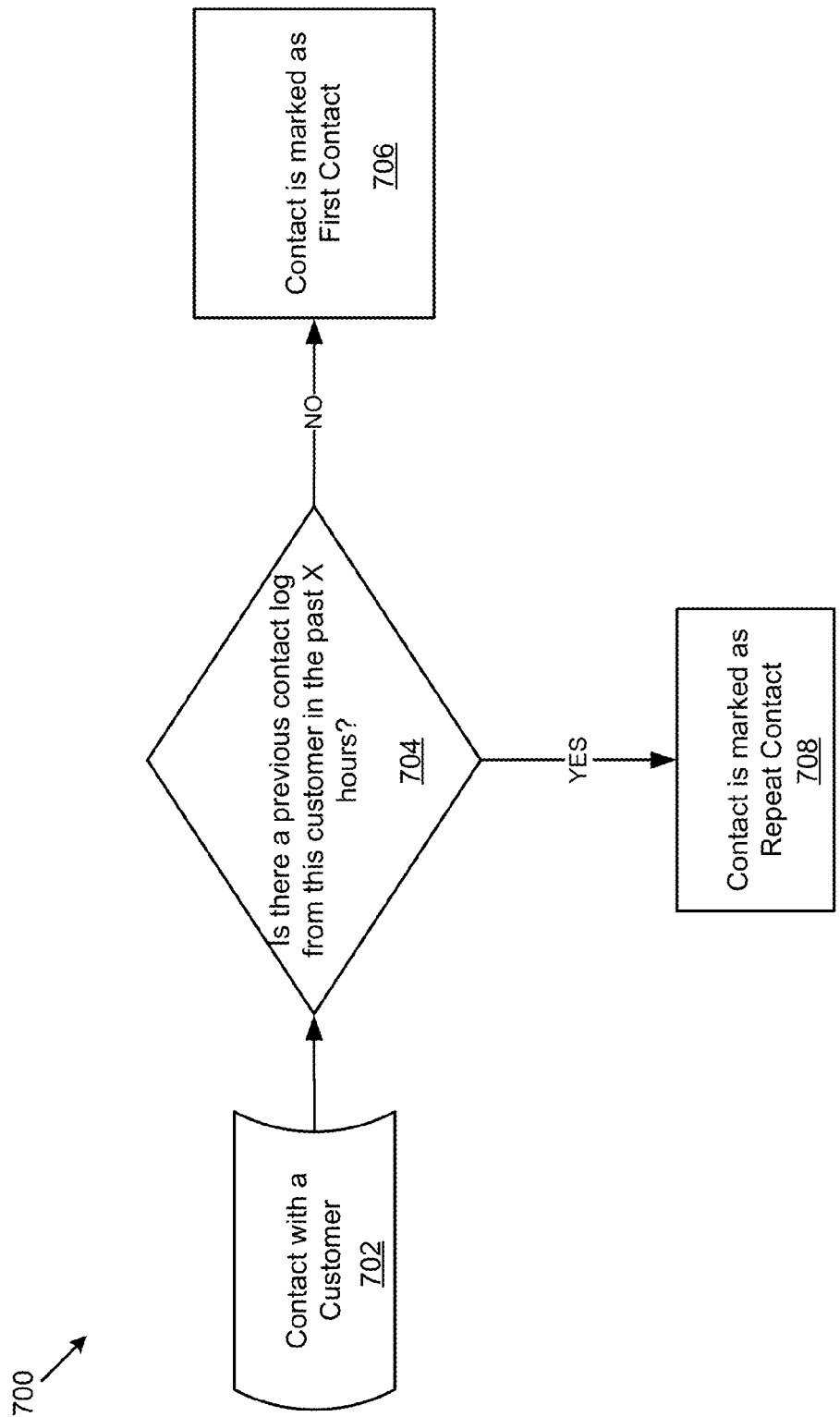
FIG. 7 shows a flow diagram for determining whether a customer interaction is a first contact or a repeat contact.

FIG. 7 shows a flow diagram of logic 700 that the churn analysis system 130 may implement for determining whether a customer interaction 702 is a first contact or a repeat contact. Given a current interaction or contact from a particular customer (represented by a Customer Identifier) 702, if no contact was logged from the same customer within X hours previous to the current contact at block 704, the current contact is flagged as a first contact at block 706. Otherwise, it is considered a repeat contact at block 708. The maximum contact intensity X represents the maximum contact intensity, or a maximum period of time, between two consecutive interactions with the same customer. The maximum contact intensity X may be defined by client or situational constraints, or through scientific or statistical methods.

For example, an internet service provider may look at historical data regarding customer calls to a customer service call center to resolve internet connectivity issues. Based on the historical data, the internet service provider may determine, on average, that if a customer does not call back within 7 days regarding the same issue, the issue has been resolved. Thus, the internet service provider may determine that an issue may be considered resolved if a customer does not call back within a resolution threshold, such as 7 days, of a previous call. Then, the internet service provider may set the maximum contact intensity X to the resolution threshold of 7 days, or 168 hours.

Figure 8:
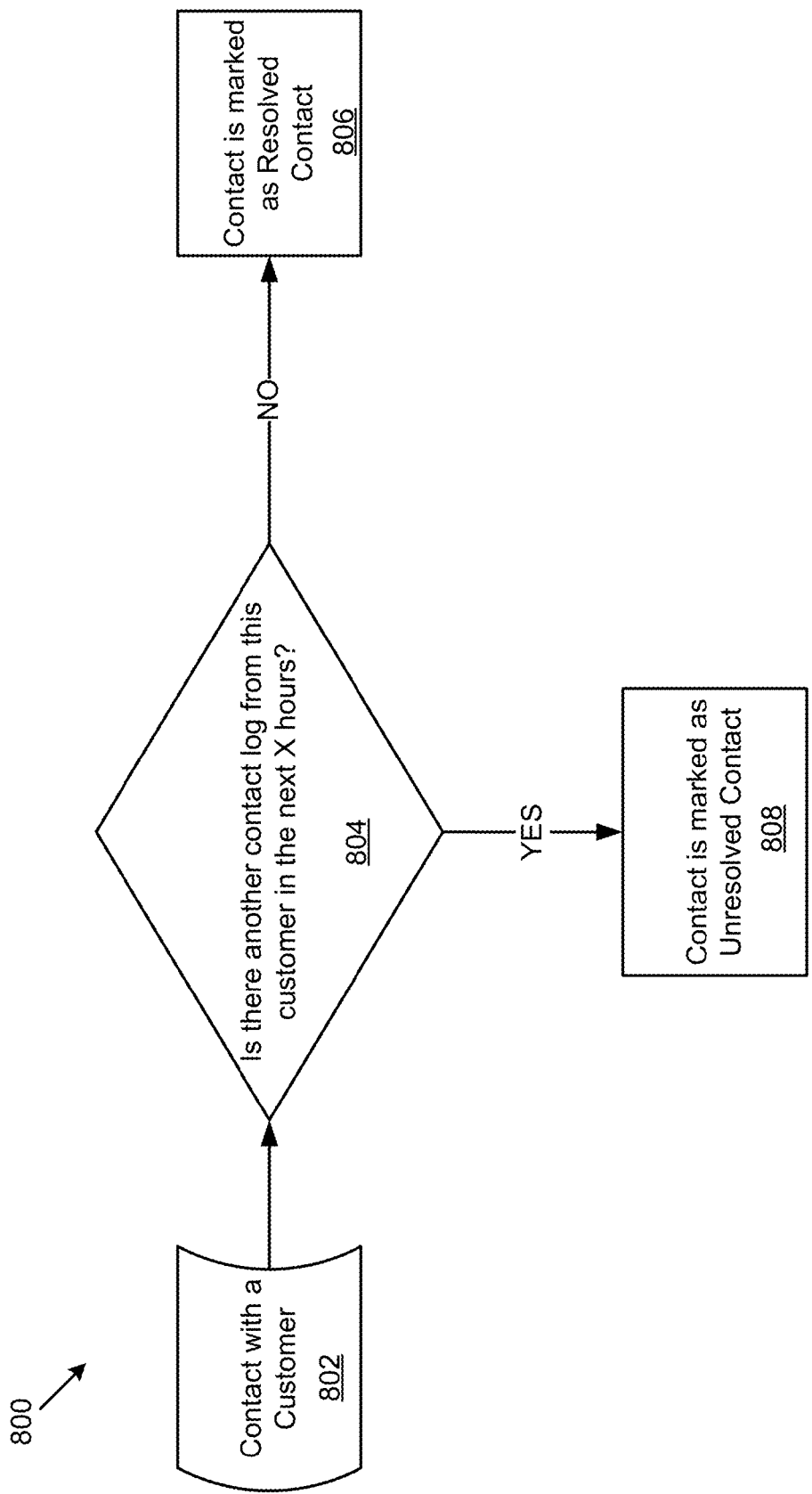
FIG. 8 shows a flow diagram for determining whether a customer interaction is a resolved contact or an unresolved contact.

FIG. 8 shows a flow diagram of logic 800 that the churn analysis system 130 may implement for determining whether a customer interaction is a resolved contact or an unresolved contact. Given a current contact from a particular customer (represented by a Customer Identifier) at block 802, if no contact is logged from the same customer within a resolution threshold, such as 7 days, after the current contact at block 804, the current contact is flagged as a resolved contact at block 806. Otherwise, the current contact is considered an unresolved contact at block 808. The resolution threshold may be defined by client or situational constraints, or through scientific or statistical methods.

Where the resolution threshold is determined as the maximum contact intensity, a Corollary of Maximum Intensity may be derived, such that every consecutive interaction within a customer experience block is within X hours from each other, chronologically or reverse chronologically.

FIG. 9a shows an exemplary USAR 900 with five customer experience blocks and eight interactions. Each customer experience block may be identified by a unique customer experience block ID 901. Each customer experience block may include one or more customer interactions, and each interaction may include attributes such as: a Customer Identifier 902 indicating the customer associated with the interaction; a Date Time Stamp 903 indicating when the interaction occurred; a first contact flag 904 indicating whether the interaction was a first contact or a repeat contact; and a resolved contact flag 905 indicating whether the interaction was a resolved contact or an unresolved contact.

Continuing with the example in FIG. 9a, customer experience block 0001 has three interactions with a customer identified as CCCCCCC: an interaction on 9 Jan. 2011, which was a first contact and unresolved contact; an interaction on 12 Jan. 2011, which was a repeat contact and unresolved contact; and an interaction on 17 Jan. 2011, which was a repeat contact and resolved contact.

Customer experience blocks may be further described as follows. A customer experience block is considered "open" if, at a current point in time, the block does not end with a resolved contact. A customer experience block is considered "closed" if, at a current point in time, the block ends with a resolved contact. A repeat customer experience block is a customer experience block with more than one contact. A first contact resolved customer experience block is a closed customer experience block with only one contact. For example, in FIG. 9, customer experience block 0002 is a first contact resolved customer experience block.

The churn analysis system 130 may include a churn prediction model 140 that has predictive and analytic capabilities. The system may use statistical tools to develop predictive models that examine and uncover relationships between historical customer data, channels of interaction and customer experience block-level attributes imbedded in churned and current customer segments.

The churn analysis system 130 may create the churn prediction model 140 based on USAR attributes and USAR derived metrics, including interaction metrics and block metrics. For example, a USAR may include a plurality of unique customer experience blocks; and each customer experience block may include a plurality of unique customer interactions. USAR attributes may include properties of interactions, properties of blocks, data elements that are captured from customer interactions, and/or metrics that are calculated or derived from the properties and/or data elements.

Attributes may be numeric or alphanumeric, whereas metrics are generally measureable values. The churn analysis system 130 may calculate an interaction metric for each unique interaction (e.g., session time), independent of the other interactions in the customer experience block. A block metric may relate to all interactions in the customer experience block (e.g., number of interactions in block).

Interaction attributes and metrics may include, for example: Row Index (a unique key for every interaction in the USAR); Channel (a flag value indicating the native channel of the interaction, for example, R=retail, T=Technical Support); Session Time (calculated as a period of time equal to the end time of the interaction (generally a transaction or case session end time) minus the start time of the interaction (generally a transaction or case session start time)); Adjusted Session Time (calculated using the same logic as Session Time, but the end time portion is adjusted to account for any transactions or sessions where the end time is inaccurately captured (e.g., an agent doesn't promptly close a session after a call); and when a subsequent transaction or session is handled by the same agent, and the start time of the subsequent transaction or session is before the end time of the current session, the end time of the current session is adjusted to equal the start time of the subsequent transaction or session); Date Key (calculated as a numeric value based on the start time of the interaction (e.g., Jan. 5, 2011 would be represented as 01052011)); Month Key (calculated as a numeric value based on the start time of the interaction (e.g., Jan. 5, 2011 would be represented as 012011)); Churn 30 Day Flag (a 1/0 flag indicating if the customer churned from the company within 30 days of the start time of the interaction); and Churn 60 Day Flag (a 1/0 flag indicating if the customer churned from the company within 60 days of the start time of the interaction).

Block attributes and metrics may include, for example: Block Index (a unique key for every customer interaction block in the USAR); First Interaction Flag (a 1/0 flag indicating if the interaction is the first interaction in the block, "first interaction" being defined as any interaction where there is no previous interaction from the same customer within X days); Resolved Flag (a 1/0 flag indicating if the interaction is the last interaction in the block, "last interaction" being defined as any interaction where there is no subsequent interaction from the same customer within X days); Interaction Sequence Number (number indicating the location of the current interaction within the block (e.g., for a four-interaction block, the first interaction would be indicated by 1, the second would be indicated by 2, and so on); Time to Next Interaction (the amount of time until the next interaction in the block); Time Since Previous Interaction; (the amount of time since the previous interaction in the block); Next Interaction Reason (the interaction reason for the next interaction in the block); Previous Interaction Reason (the interaction reason for the previous interaction in the block); Agents In Block (the total number of distinct agents or employees involved in the block of interactions); Agent Ownership Flag (a 1/0 flag indicating if all the interactions in the block were handled by the same agent or the same employee; for cross-channel blocks, this will generally be 0, which indicates No); Transferred Flag (a 1/0 flag indicating if the interaction resulted in a transfer, calculated as a subsequent interaction in the same channel with a start time within five minutes of the end time of the current interaction); Interactions Per Block (the count of the total number of interactions in the block); Minutes Per Block (calculated as the sum number of minutes (from sessions time or adjusted session time) for all interactions in the block); Days Per Block (the number of days between the start date of the first interaction in the block, and end date of the last interaction in the block); Block Path (depicts the path the customer went through in the block of interactions (e.g., if the block consists of four interactions, first Retail, then Technical Support, then back to Retail twice, the Block Path would be RTRR)); Channels In Block (counts the number of unique channels the customer touched in the block); and Average Intensity (calculated as the average time between each interaction in the block).

Attributes and metrics may vary depending on the channel of interaction, industry of the service provider, or business objectives. For example, if a customer calls a customer service call center, the service provider may track the start and end time of the call, the reason for the call and the identity of the customer service representative who handles the call. If a customer purchases or exchanges a mobile phone at a retail store, the retail store may track the date and time of the transaction, a description of any purchased or exchanged devices, and the store number and sales representative who serviced the customer.

The following tables show examples of USAR attributes that the system may process. The system may process additional, fewer or different attributes in other implementations.

Table of USAR Attributes for Call Center Interactions

| ID | USAR Field Name | Description |
| --- | --- | --- |
| 1.00 | CHANNEL | Channel the interaction occurred in |
| 1.01 | NATIVE_ID | Unique ID given to the customer interaction |
| 1.02 | NATIVE_ROWINDEX | Unique number given to each interaction within a particular USAR |
| 1.03 | ACCT_NUMBER | Unique billing account number |
| 1.04 | SUB_ID | Unique subscriber number for each customer |
| 1.05 | START_DATE_TIME | Start date and time of interaction |
| 1.06 | END_DATE_TIME | End date and time of interaction |
| 1.07 | CSAT | Overall Satisfaction Rating from Customer Satisfaction Survey |
| 1.08 | AGENT | Identifies agent who handled the call |
| 1.09 | TOPIC | Primary reason code given by agent to interaction |
| 1.10 | SUB_TOPIC | Secondary reason code given to interaction by agent |
| 1.11 | RESULT | Indicates result of the interaction (transferred, resolved, etc.) |
| 1.12 | TRAN_TYPE | Transaction type |
| 1.13 | RowIndex | Unique identifier for each interaction within a resolution block |
| 1.14 | FIRST_CALL_FLAG | Indicates whether this was the first interaction in the block |
| 1.15 | RESOLVED_FLAG | Indicates if this is the last call in the block - no call within 7 days after the call from the subscriber/customer |
| 1.16 | BlockIndex | Unique number for each block of interactions; all interactions in a block will have the same BlockIndex |
| 1.17 | CALL_SEQUENCE_NUMBER | Indicates location of the interaction in the block by sequence of interactions |
| 1.18 | CALLS_IN_BLOCK | Indicates number of interactions in the block |
| 1.19 | AGENTS_IN_BLOCK | Indicates total number of agents that took calls in the block |
| 1.20 | AGENT_OWNERSHIP_FLAG | Indicates whether all calls in the block were taken by one agent |

Table of USAR Attributes for Customer Care Interactions

| ID | USAR Field Name | Description |
| --- | --- | --- |
| 1.00 | INTERACTION_ID | Unique interaction ID for each data row |
| 1.01 | CONTACT_TYPE | Indicates whether interaction was initiated by customer or service provider |
| 1.02 | START_DATE_TIME | Start date and time of interaction |
| 1.03 | END_DATE_TIME | End time and date for specific interaction |
| 1.04 | ACCT_NUMBER | Unique billing account number |
| 1.05 | SUB_ID | Unique subscriber number for each customer |
| 1.06 | SUB_MARKET | City/State the subscriber/customer is assigned |
| 1.07 | ACCOUNT_TYPE | Indicates type of account: individual, corporate or public sector |
| 1.08 | ACCOUNT_SUB_TYPE | Additional detail for description of account type |
| 1.09 | AGENT_LOGIN | Login ID for the agent who took the call |
| 1.10 | AGENT_SITE | Agent site location |
| 1.11 | WORKGROUP | Agent group that took the call (queue) |
| 1.12 | SUB_WORKGROUP | More specific description of group that took call |
| 1.13 | TOUCHPOINT_NAME | Part of the organization the call was taken in |
| 1.14 | TOPIC | High level reason code for the call |
| 1.15 | SUBTOPIC | More detailed reason of the call |
| 1.16 | RESULT | Indicates result of the interaction (transferred, resolved, etc.) |
| 1.17 | PROBLEM_CODE_1 | Key or code indicating the primary topic |
| 1.18 | PROBLEM_CODE_2 | Key or code indicating the secondary topic |
| 1.19 | PROBLEM_CODE_3 | Key or code indicating the tertiary topic |
| 1.20 | DATE_KEY | Eight digit number with date, month and year of interaction |
| 1.21 | MONTH_KEY | Six digit number with month and year of interaction |
| 1.22 | QUEUE_NAME | High level queue the call was in (customer care, technical support, etc.) |
| 1.23 | QUEUE_DESCRIPTION | More detailed description of queue the call was placed in |

Table of USAR Attributes for Customer Care Interactions

| ID | USAR Field Name | Description |
|---|---|---|
| 1.24 | ARPU | Average revenue per user |
| 1.25 | CONTRACT_START_DATE | Contract start date |
| 1.26 | CONTRACT_END_DATE | Customer contract end date |
| 1.27 | PCE_IN_DAYS | Days left in contract counting from date of interaction |
| 1.28 | DEV_EFF_DT | Indicates date that device was activated on account |
| 1.29 | DEV_SKU_NBR | SKU number of the device currently on the account |
| 1.30 | LIAB_CD | Liability code |
| 1.31 | ACCT_SIZE_CD | Number of subscribers on a billing account number |
| 1.32 | ACCT_TYPE_CD | Code for the type of account |
| 1.33 | CREDIT_CLASS_CD | Code for the customer credit class |
| 1.34 | SRVC_ST_DT | Day and year the account was activated |
| 1.35 | SURVEY_ID | Unique ID for customer satisfaction survey |
| 1.36 | SURVEY_LANGUAGE | Language of survey given to the subscriber |
| 1.37 | OVERALL_SATISFACTION | Overall Satisfaction Rating from Customer Satisfaction Survey |
| 1.38 | LISTENING | Customer Satisfaction survey question probing agent's listening skills |
| 1.39 | UNDERSTANDING | Customer Satisfaction survey question probing if agent understood issue reported |
| 1.40 | KNOWLEDGEABLE | Agent knowledge assessment Rating from Customer Satisfaction Survey |
| 1.41 | FIRST_CALL | Customer Satisfaction survey question probing if contact was the first for issue reported |
| 1.42 | ISSUE_RESOLUTION | Issue Resolution Rating from Customer Satisfaction Survey |
| 1.43 | LEVEL_OF_EFFORT | Customer Satisfaction Survey Rating for level of effort required to resolve the issue |
| 1.44 | RowIndex | Unique identifier for each interaction within a resolution block |
| 1.45 | BlockIndex | Unique number for each block of interactions; all interactions in a block will have the same BlockIndex |
| 1.46 | FIRST_CONTACT_FLAG | Indicates whether this was the first interaction in the block |
| 1.47 | RESOLVED_FLAG | Indicates if this is the last call in the block - no call within 7 days after the call from the subscriber |
| 1.48 | CONTACT_SEQUENCE_NUMBER | Indicates location of the interaction in the block by sequence of interactions |
| 1.49 | CONTACTS_IN_BLOCK | Indicates number of interactions in the block |
| 1.50 | TIME_TO_NEXT_CONTACT_HOURS | Time between this interaction and next interaction in the block |
| 1.51 | TIME_SINCE_PREVIOUS_CONTACT_HOURS | Time since previous contact in the block |
| 1.52 | AGENTS_IN_BLOCK | Indicates total number of agents that took calls in the block |
| 1.53 | AGENT_OWNERSHIP_FLAG | Indicates whether all calls in the block were taken by one agent |
| 1.54 | NEXT_TOPIC | Topic on the next call in the block |
| 1.55 | NEXT_SUBTOPIC | Subtopic on the next call in the block |
| 1.56 | NEXT_RESULT | Result on the next call in the block |
| 1.57 | PREVIOUS_TOPIC | Topic of the previous call in the block |
| 1.58 | PREVIOUS_SUBTOPIC | Subtopic of the previous call in the block |
| 1.59 | PREVIOUS_RESULT | Result of the previous call in the block |
| 1.60 | PORT_IN | Indicates whether the subscriber ported their number to service provider |
| 1.61 | PORT_OUT | Indicates whether the subscriber ported their number from service provider when subscriber churned |
| 1.62 | SBSCR_TRMTN_DT | Day and Year the subscriber ended service |
| 1.63 | CHURN_REASON_CD | Reason subscriber gave for leaving service provider |
| 1.64 | THIRTY_DAY_CHURN_FLAG | Indicates whether customer terminated their service within 30 days of this interaction |
| 1.65 | SIXTY_DAY_CHURN_FLAG | Indicates whether the subscriber terminated their service within 60 days of interaction |

Table of USAR Attributes for Technical Support Interactions

| ID | USAR Field Name | Description |
|---|---|---|
| 1.00 | INTERACTION_ID | Unique interaction ID |
| 1.01 | SUB_ID | Unique subscriber number for each customer |
| 1.02 | AGENT_ID | Identifies agent handling the call |
| 1.03 | START_DATE_TIME | Start date and time of call |
| 1.04 | RowIndex | Unique identifier for every interaction within a block |
| 1.05 | FIRST_CONTACT_FLAG | Flag indicating whether contact is the first contact within a block |
| 1.06 | RESOLVED_FLAG | Flag indicating whether contact was a resolved contact, or the last contact within a block |
| 1.07 | BlockIndex | Unique identifier for each block |
| 1.08 | CONTACT_SEQUENCE_NUMBER | Number indicating the location of the current interaction within the block |
| 1.09 | CONTACTS_IN_BLOCK | Number of interactions in a block |
| 1.10 | AGENTS_IN_BLOCK | Number of Agents handling interactions in a block |
| 1.11 | AGENT_OWNERSHIP_FLAG | Indicates whether one agent handled all interactions within a block |
| 1.12 | ACCT_NUMBER | Billing Account Number, designates a customer or customer location to be billed |
| 1.13 | MONTH_KEY | Month in which interaction occurred |
| 1.14 | END_DATE_TIME | End date and time of the interaction |
| 1.15 | FUNCTIONAL_AREA | Agent's Functional Area |
| 1.16 | SITE_NAME | Agent's Location |
| 1.17 | CONTACT_TYPE | Whether the call was inbound or outbound |
| 1.18 | TOPIC | Reason Code for Call |
| 1.19 | SUB_TOPIC | Sub reason code for call |
| 1.20 | RESULT | Indicates the result of the call; whether the reason for the call was resolved |
| 1.21 | SURVEY_ID | Unique customer satisfaction survey ID |
| 1.22 | OVERALL_SATISFACTION | Overall Satisfaction Rating from Customer Satisfaction Survey |
| 1.23 | LISTENING | Customer Satisfaction survey question probing agent's listening skills |
| 1.24 | UNDERSTANDING | Customer Satisfaction survey question probing whether agent understood issue reported |
| 1.25 | KNOWLEDGEABLE | Agent knowledge assessment Rating from Customer Satisfaction Survey |
| 1.26 | FIRST_CALL | Customer Satisfaction survey question probing if contact was the first for issue reported |
| 1.27 | ISSUE_RESOLUTION | Issue Resolution Rating from Customer Satisfaction Survey |
| 1.28 | LEVEL_OF_EFFORT | Agent rating of level of effort to resolution from customer Satisfaction survey |

Table of USAR Attributes for Retail Interactions

| ID | USAR Field Name | Description |
|---|---|---|
| 1.00 | INTERACTION_ID | Unique interaction ID |
| 1.01 | SUB_ID | Unique subscriber number for each customer |
| 1.02 | AGENT_ID | Identifies agent who handled the call |
| 1.03 | START_DATE_TIME | Start date and time of interaction |
| 1.04 | RowIndex | Unique identifier for each interaction within a resolution block |
| 1.05 | FIRST_CONTACT_FLAG | Indicates whether this was the first interaction in the block |
| 1.06 | RESOLVED_FLAG | Flag indicative of a resolution within a block |
| 1.07 | BlockIndex | Unique number for each block of interactions; all interactions in a block will have the same BlockIndex |
| 1.08 | CONTACT_SEQUENCE_NUMBER | Indicates location of the interaction in the block by sequence of interactions |
| 1.09 | CONTACTS_IN_BLOCK | Indicates number of interactions in the block |
| 1.10 | AGENTS_IN_BLOCK | Indicates total number of agents that took calls in the block |
| 1.11 | AGENT_OWNERSHIP_FLAG | Indicates whether all calls in the block were taken by one agent |
| 1.12 | ACCT_NUMBER | Unique Billing Account Number |
| 1.13 | MONTH_KEY | Month and year of transaction |
| 1.14 | END_DATE_TIME | End date for Interaction |

-continued

Table of USAR Attributes for Retail Interactions

| ID | USAR Field Name | Description |
|---|---|---|
| 1.15 | FUNCTIONAL_AREA | Agent Functional Area |
| 1.16 | SITE_NAME | Agent Site Location |
| 1.17 | CONTACT_TYPE | Indicates whether interaction was initiated by customer or service provider |
| 1.18 | TOPIC | Reason Code for Call |
| 1.19 | SUB_TOPIC | Sub reason code for call |
| 1.20 | RESULT | Indicates result of the interaction (transferred, resolved, etc.) |
| 1.21 | SURVEY_ID | Unique ID for customer satisfaction survey |
| 1.22 | OVERALL_SATISFACTION | Overall Satisfaction Rating from Customer Satisfaction Survey |
| 1.23 | LISTENING | Customer Satisfaction survey question probing agent's listening skills |
| 1.24 | UNDERSTANDING | Customer Satisfaction survey question probing if agent understood issue reported |
| 1.25 | KNOWLEDGEABLE | Agent knowledge assessment Rating from Customer Satisfaction Survey |
| 1.26 | FIRST_CALL | Customer Satisfaction survey question probing if contact was the first for issue reported |
| 1.27 | ISSUE_RESOLUTION | Issue Resolution Rating from Customer Satisfaction Survey |
| 1.28 | LEVEL_OF_EFFORT | Customer Satisfaction Survey Rating for level of effort required to resolve the issue |
| 1.29 | INTERACTION_ID | Unique interaction ID |
| 1.30 | SUB_ID | Unique subscriber number for each customer |
| 1.31 | AGENT | Identifies agent who handled the call |
| 1.32 | START_DATE_TIME | Start date and time of interaction |
| 1.33 | RowIndex | Unique identifier for each interaction within a resolution block |
| 1.34 | FIRST_CONTACT_FLAG | Indicates whether this was the first interaction in the block |
| 1.35 | RESOLVED_FLAG | Flag indicative of a resolution within a block |
| 1.36 | BlockIndex | Unique number for each block of interactions; all interactions in a block will have the same BlockIndex |
| 1.37 | CONTACT_SEQUENCE_NUMBER | Indicates location of the interaction in the block by sequence of interactions |
| 1.38 | CONTACTS_IN_BLOCK | Indicates number of interactions in the block |
| 1.39 | AGENTS_IN_BLOCK | Indicates total number of agents that took calls in the block |
| 1.40 | AGENT_OWNERSHIP_FLAG | Indicates whether all calls in the block were taken by one agent |
| 1.41 | ACCT_NUMBER | Unique Billing Account Number |
| 1.42 | MONTH_KEY | Month and year of transaction |
| 1.43 | END_DATE_TIME | End date for Interaction |
| 1.44 | FUNCTIONAL_AREA | Agent Functional Area |
| 1.45 | SITE_NAME | Agent Site Location |
| 1.46 | CONTACT_TYPE | Indicates whether interaction was initiated by customer or service provider |
| 1.47 | TOPIC | Reason Code for Call |
| 1.48 | SUB_TOPIC | Sub reason code for call |
| 1.49 | RESULT | Indicates result of the interaction (transferred, resolved, etc.) |
| 1.50 | SURVEY_ID | Unique ID for customer satisfaction survey |
| 1.51 | OVERALL_SATISFACTION | Overall Satisfaction Rating from Customer Satisfaction Survey |
| 1.52 | LISTENING | Customer Satisfaction survey question probing agent's listening skills |
| 1.53 | UNDERSTANDING | Customer Satisfaction survey question probing if agent understood issue reported |
| 1.54 | KNOWLEDGEABLE | Agent knowledge assessment Rating from Customer Satisfaction Survey |
| 1.55 | FIRST_CALL | Customer Satisfaction survey question probing if contact was the first for issue reported |
| 1.56 | ISSUE_RESOLUTION | Issue Resolution Rating from Customer Satisfaction Survey |
| 1.57 | LEVEL_OF_EFFORT | Customer Satisfaction Survey Rating for level of effort required to resolve the issue |
| 1.58 | INTERACTION_ID | Unique interaction ID |
| 1.59 | SUB_ID | Unique subscriber number for each customer |
| 1.60 | AGENT | Identifies agent who handled the call |
| 1.61 | START_DATE_TIME | Start date and time of interaction |
| 1.62 | RowIndex | Unique identifier for each interaction within a resolution block |
| 1.63 | FIRST_CONTACT_FLAG | Indicates whether this was the first interaction in the block |

Table of USAR Attributes for Retail Interactions

| ID | USAR Field Name | Description |
| --- | --- | --- |
| 1.64 | RESOLVED_FLAG | Flag indicative of a resolution within a block |
| 1.65 | BlockIndex | Unique number for each block of interactions; all interactions in a block will have the same BlockIndex |
| 1.66 | CONTACT_SEQUENCE_NUMBER | Indicates location of the interaction in the block by sequence of interactions |
| 1.67 | CONTACTS_IN_BLOCK | Indicates number of interactions in the block |
| 1.68 | AGENTS_IN_BLOCK | Indicates total number of agents that took calls in the block |
| 1.69 | AGENT_OWNERSHIP_FLAG | Indicates whether all calls in the block were taken by one agent |
| 1.70 | ACCT_NUMBER | Unique Billing Account Number |
| 1.71 | MONTH_KEY | Month and year of transaction |
| 1.72 | END_DATE_TIME | End date for Interaction |
| 1.73 | FUNCTIONAL_AREA | Agent Functional Area |
| 1.74 | SITE_NAME | Agent Site Location |
| 1.75 | CONTACT_TYPE | Indicates whether interaction was initiated by customer or service provider |
| 1.76 | TOPIC | Reason Code for Call |
| 1.77 | SUB_TOPIC | Sub reason code for call |
| 1.78 | RESULT | Indicates result of the interaction (transferred, resolved, etc.) |
| 1.79 | SURVEY_ID | Unique ID for customer satisfaction survey |
| 1.80 | OVERALL_SATISFACTION | Overall Satisfaction Rating from Customer Satisfaction Survey |
| 1.81 | LISTENING | Customer Satisfaction survey question probing agent's listening skills |
| 1.82 | UNDERSTANDING | Customer Satisfaction survey question probing if agent understood issue reported |
| 1.83 | KNOWLEDGEABLE | Agent knowledge assessment Rating from Customer Satisfaction Survey |
| 1.84 | FIRST_CALL | Customer Satisfaction survey question probing if contact was the first for issue reported |
| 1.85 | ISSUE_RESOLUTION | Issue Resolution Rating from Customer Satisfaction Survey |

Table of USAR Attributes for Web Interactions

| ID | USAR Field Name | Description |
| --- | --- | --- |
| 1.00 | SUB_ID | Unique subscriber number for each customer |
| 1.01 | START_DATE_TIME | Start date and time of interaction |
| 1.02 | END_DATE_TIME | End date and time of the interaction |
| 1.03 | ROWINDEX | Unique identifier for each interaction within a resolution block |
| 1.04 | ANALYZE_PLAN_HISTORY | Indicates if customer looked at usage over time |
| 1.05 | ANALYZE_PLAN_RECOMMENDATION | Indicates if customer received a better fit plan recommendation |
| 1.06 | ANALYZE_PLAN_NOT_SUPPORTED | Indicates if customer is on a special plan and bypassed the good fit option |
| 1.07 | ANALYZE_PLAN_GOOD_FIT_RECOMMENDATION | Indicates if customer is on the plan that best fits their usage |
| 1.08 | CHANGE_BILL_DELIVERY | Indicates if customer changed the way their bill was delivered |
| 1.09 | CHECK_CONTRACT_EXPIRATION | Indicates if customer checked when their contract was expiring |
| 1.10 | HANDSET_UPGRADE_CHECK_LOGIN | Indicates if customer checked upgrade eligibility |
| 1.11 | REBATE_STATUS | Indicates if customer checked rebates status |
| 1.12 | TRACK_ORDER | Indicates if customer tracked order |
| 1.13 | COMMUNITY_LANDING_PAGE | Indicates if customer visited the community page |
| 1.14 | THIRTY_DAY_GUARANTEE | Indicates if customer visited the 30 day guarantee page |
| 1.15 | BUSINESS_HOME_PAGE | Indicates if customer visited the business home page |
| 1.16 | PROVIDER_SERVICES | Indicates if customer visited the provider's services page |
| 1.17 | COVERAGE_MAP | Indicates if customer visited the coverage map web page |

-continued

Table of USAR Attributes for Web Interactions

| ID | USAR Field Name | Description |
|---|---|---|
| 1.18 | BLOCK_DOWNLOAD | Customer opted to block downloads |
| 1.19 | BLOCK_TEXT | Customer opted to block texts |
| 1.20 | VALUED_CUSTOMER_LOYALTY_OFFER_PLAN_CHECK | Customer visited loyalty offer webpage |
| 1.21 | VALUED_CUSTOMER_LOYALTY_OFFER_WELCOME | Customer visited loyalty offer webpage |
| 1.22 | VALUED_CUSTOMER_LOYALTY_OFFER_COMMUNITY_FORUM | Customer visited loyalty offer webpage |
| 1.23 | VALUED_CUSTOMER_LOYALTY_OFFER_EMAIL_UPDATE | Customer visited loyalty offer webpage |
| 1.24 | VALUED_CUSTOMER_LOYALTY_OFFER_ELIGIBILITY | Customer visited loyalty offer webpage |
| 1.25 | VALUED_CUSTOMER_LOYALTY_OFFER_ANNIVERSARY_REWARD | Customer visited loyalty offer webpage |
| 1.26 | VALUED_CUSTOMER_LOYALTY_OFFER_PHONE_UPGRADE | Customer visited loyalty offer webpage |
| 1.27 | VALUED_CUSTOMER_LOYALTY_OFFER_JUST_BECAUSE | Customer visited loyalty offer webpage |
| 1.28 | VALUED_CUSTOMER_LOYALTY_OFFER_ACCESSORY | Customer visited loyalty offer webpage |
| 1.29 | VALUED_CUSTOMER_LOYALTY_OFFER_EARLY_PHONE_UPGRADE | Customer visited loyalty offer webpage |
| 1.30 | VALUED_CUSTOMER_LOYALTY_OFFER_FIRST_TO_BUY | Customer visited loyalty offer webpage |
| 1.31 | PROMOTION | Customer checked promotion page |
| 1.34 | PHOTOS | Customer visited the photos page |
| 1.35 | NAVIGATION | Customer visited the navigation page |
| 1.36 | ADD_ACCOUNT_TO_PROFILE | Indicates customer added an account to the profile online |
| 1.37 | UPDATE_EMAIL_ADDRESS | Customer updated email address online |
| 1.38 | UPDATE_PROFILE | Customer updated profile online |
| 1.39 | DEVICE_LANDING_PAGE | Customer visited device landing page |
| 1.40 | CHAT_CONVERSATION | Customer started chat conversation |
| 1.41 | CHAT_ENGAGED | Customer engaged in chat conversation |
| 1.42 | CHAT_CLOSED | Customer closed chat conversation |
| 1.43 | CHAT_INVITATION | Customer sent chat invitation |
| 1.44 | DISCOVER_CONNECT | Customer visited page |
| 1.45 | DISCOVER_SIGN_IN | Customer signed into Discover page |
| 1.46 | HANDSET_UPGRADE_CHECK_UPGRADE | Customer checked upgrade eligibility |
| 1.47 | TEXT_MESSAGING | Customer used text messaging on web |
| 1.48 | PROVIDER_TV | Customer visited provider's TV page |
| 1.49 | SUPPORT_LANDING_PAGE | Customer visited support landing page |
| 1.50 | DATE_KEY | Date month and year of the transaction |
| 1.51 | MONTH_KEY | Month and year of transaction |
| 1.52 | FIRST_CONTACT_FLAG | Indicates whether this was the first interaction in the block |
| 1.53 | RESOLVED_FLAG | Indicates if this is the last contact in the block - no call within 7 days after the call from the subscriber |
| 1.54 | CONTACT_SEQUENCE_NUMBER | Indicates location of the interaction in the block by sequence of interactions |
| 1.55 | CONTACTS_IN_BLOCK | Indicates number of interactions in the block |
| 1.56 | TIME_TO_NEXT_CONTACT_HOURS | Time between this interaction and next interaction in the block |
| 1.57 | TIME_SINCE_PREVIOUS_CONTACT_HOURS | Time since previous contact in the block |
| 1.58 | BLOCKINDEX | Unique number for each block of interactions; all interactions in a block will have the same BLOCKINDEX |
| 1.59 | ARPU | Average revenue per user |
| 1.60 | CONTRACT_START_DATE | Contract start date |
| 1.61 | CONTRACT_END_DATE | Customer contract end date |
| 1.62 | DAYS_LEFT_IN_CONTRACT | Days left in contract counting from date of interaction |
| 1.63 | DEV_EFF_DT | Indicates date that device was activated on account |
| 1.64 | DEV_SKU_NBR | SKU number of device on account |
| 1.65 | LIAB_CD | Liability code for Billing Purposes |
| 1.66 | ACCT_SIZE_CD | Number of subscribers on a billing account number |
| 1.67 | ACCT_TYPE_CD | Code for the type of account |
| 1.68 | CREDIT_CLASS_CD | Code for the customer credit class |
| 1.69 | PORT_IN | Indicates whether the subscriber ported their number to service provider |
| 1.70 | PORT_OUT | Indicates whether the subscriber ported their number from service provider when subscriber churned |
| 1.71 | SRVC_STRT_DT | Day and year the account was activated |
| 1.72 | SBSCR_TRMTN_DT | Day and Year the subscriber ended service |
| 1.73 | CHURN_REASON | Reason subscriber gave for leaving service provider |
| 1.74 | THIRTY_DAY_CHURN_FLAG | Indicates whether customer terminated their service within 30 days of this interaction |
| 1.75 | SIXTY_DAY_CHURN_FLAG | Indicates whether the subscriber terminated their service within 60 days of interaction |

| Table of USAR Attributes for Email Interactions | | |
|---|---|---|
| ID | USAR Field Name | Description |
| 1.00 | MESSAGE_ID | Unique identifier for each message |
| 1.01 | CREATE_DATE | Date of message creation |
| 1.02 | COMPLETE_DATE | Date of message completion |
| 1.03 | COMPLETE_USER_ID | Service Experience Management system User ID |
| 1.04 | WITHIN_SERVICE_LEVEL | Service Level Indicators |
| 1.05 | Account Type | Account type identifier |
| 1.06 | Contract Start Date | Customer contract start date |
| 1.07 | Contract End Date | Customer contract end date |
| 1.08 | Credit Cls | Code indicating customer credit class |
| 1.09 | Form Name | Name identifying type of form for service |
| 1.10 | Form Topic | Name identifying type of form for service |
| 1.11 | Form Sub Topic | Name identifying type of form for service |
| 1.12 | Hot Lined Flag | Indicates hot lined phone |
| 1.13 | Account Number | Unique Billing Account Number |
| 1.14 | Subscription ID | Unique subscriber ID |
| 1.15 | MDN | mobile device number |
| 1.16 | Number of Phones | Number of phones associated with billing account number |
| 1.17 | ProviderLoyaltyAccountValue | Value of loyalty account |
| 1.18 | Account Establishment Date | Account Establishment date |
| 1.19 | Account Corporate Liable Flag | Corporate Liable Flag |
| 1.20 | New Plan Name | New Plan Name |
| 1.21 | Summary | Summary |
| 1.22 | Add Product - Mobile Hotspot | Indicates customer added Mobile Hotspot feature |
| 1.23 | Add Product - Plan Feature-Data | Indicates customer added Data Plan feature |
| 1.24 | Add Product - Plan Feature-Novelty | Indicates customer added Novelty feature |
| 1.25 | Add Product - Plan Feature-Text | Indicates customer added Text feature |
| 1.26 | Add Product - Plan Feature-Voice | Indicates customer added Voice feature |
| 1.27 | Add Product - Service Credit | Indicates customer received Service Credit |
| 1.28 | Add Product - INSURANCE | Indicates customer added Equipment Protection option |
| 1.29 | Delete Product - Mobile Hotspot | Indicates whether customer deleted Mobile Hotspot Feature |
| 1.30 | Delete Product - Plan Feature-Data | Indicates whether customer deleted Data Plan Feature |
| 1.31 | Delete Product - Plan Feature-Novelty | Indicates whether customer deleted Novelty Feature |
| 1.32 | Delete Product - Plan Feature-Text | Indicates whether customer deleted Text Feature |
| 1.33 | Delete Product - Plan Feature-Voice | Indicates whether customer deleted Voice Feature |
| 1.34 | Delete Product - Service Credit | Indicates whether customer received Service Credit for deleting a feature |
| 1.35 | Delete Product - INSURANCE | Indicates whether customer deleted Equipment Protection option |
| 1.36 | RowIndex | Unique identifier for each interaction within a resolution block |
| 1.37 | BlockIndex | Unique number for each block of interactions; all interactions in a block will have the same BlockIndex |
| 1.38 | FIRST_CONTACT_FLAG | Indicates whether this was the first interaction in the block |
| 1.39 | RESOLVED_FLAG | Flag indicator for resolution in a block |
| 1.40 | CONTACT_SEQUENCE_NUMBER | Indicates location of the interaction in the block by sequence of interactions |
| 1.41 | CONTACTS_IN_BLOCK | Indicates number of interactions in the block |
| 1.42 | TIME_TO_NEXT_CONTACT_HOURS | Time between this interaction and next interaction in the block |
| 1.43 | TIME_SINCE_PREVIOUS_CONTACT_HOURS | Time since previous contact in the block |

| Table of USAR Attributes for Warranty Interactions | | |
|---|---|---|
| ID | USAR Field Name | Description |
| 1.00 | SBSCR_NBR | Unique subscriber number for each customer |
| 1.01 | TRAN_ID | Unique number identifying transaction |
| 1.02 | MONTH_KEY | Month and year of transaction |

-continued

Table of USAR Attributes for Warranty Interactions

| ID | USAR Field Name | Description |
|---|---|---|
| 1.03 | DATE_KEY | Date month and year of the transaction |
| 1.04 | TRAN_DT | Transaction date |
| 1.05 | TRAN_TYPE | Transaction type |
| 1.06 | REPLMT_AT_STORE | Customer received replacement device in store |
| 1.07 | REPLMT_SHIP_CUST | Replacement device was shipped to customer |
| 1.08 | ESN_NBR | Electronic Serial Number on current device |
| 1.09 | SKU_NBR | SKU number on current device |
| 1.10 | REPLMT_ESN_NBR | Electronic Serial Number on replacement device |
| 1.11 | REPLMT_IMEI_ID | Replacement IMEI ID |
| 1.12 | REPLMT_SKU_NBR | SKU number on replacement device |
| 1.13 | TRAN_BEGIN_DT | Transaction initiation date |
| 1.14 | TRAN_END_DT | Transaction End date |
| 1.15 | SRC_SYS_NME | Data system name |
| 1.16 | NTF_CD | Indicates No Trouble Found, used as a possible outcome in assessing or troubleshooting device issues |
| 1.17 | INSURANCE_CD | Indicates whether customer has equipment protection insurance |
| 1.18 | ESRP_CD | Code for Equipment and Service Repair Program |
| 1.19 | ERP_CD | Code for Equipment Replacement Program |
| 1.20 | DP_CD | Disposition code |
| 1.21 | THIRTY_DAY_XCHG_CD | 30 day return policy flag |
| 1.22 | REPLMT_DEV_COST_AMT | Replacement device cost amount |
| 1.23 | DEV_MODEL_TYPE_NME | Device model type |
| 1.24 | REPLMT_MODEL_TYPE_NME | Replacement model type name |
| 1.25 | REPLMT_DEV_TYPE_NME | Replacement device type name |
| 1.26 | REPLMT_DEV_QLTY_NME | Quality of Replacement Device Being Used |
| 1.27 | CHNL_TYPE_DES | Channel claim was filed in |
| 1.28 | MDN_NBR | Mobile device number |
| 1.29 | PRCS_INSTC_ID | Process Instance Identifier; value is always |
| 1.30 | RowIndex | Unique identifier for each interaction within a resolution block |
| 1.31 | BlockIndex | Unique number for each block of interactions; all interactions in a block will have the same BlockIndex |
| 1.32 | FIRST_CONTACT_FLAG | Indicates whether this was the first interaction in the block |
| 1.33 | RESOLVED_FLAG | Flag indicator for resolution in a block |
| 1.34 | CONTACT_SEQUENCE_NUMBER | Indicates location of the interaction in the block by sequence of interactions |
| 1.35 | CONTACTS_IN_BLOCK | Indicates number of interactions in the block |
| 1.36 | TIME_TO_NEXT_CONTACT_HOURS | Time between this interaction and next interaction in the block |
| 1.37 | TIME_SINCE_PREVIOUS_CONTACT_HOURS | Time since previous contact in the block |
| 1.38 | ARPU | Average revenue per user |
| 1.39 | CONTRACT_START_DATE | Contract start date |
| 1.40 | CONTRACT_END_DATE | Customer contract end date |
| 1.41 | PCE_IN_DAYS | Days left in contract counting from date of interaction |
| 1.42 | DEV_EFF_DT | Indicates date that device was activated on account |
| 1.43 | DEV_SKU_NBR | Device SKU number |
| 1.44 | LIAB_CD | Liability code |
| 1.45 | ACCT_SIZE_CD | Number of subscribers on a billing account number |
| 1.46 | ACCT_TYPE_CD | Account network type (IDEN/CDMA) |
| 1.47 | CREDIT_CLASS_CD | Code indicating customer credit class |
| 1.48 | PORT_IN | Indicates whether the subscriber ported their number to service provider |
| 1.49 | PORT_OUT | Indicates whether the subscriber ported their number from service provider when subscriber churned |
| 1.50 | SRVC_STRT_DT | Customer churn date |
| 1.51 | SBSCR_TRMTN_DT | Day and Year the subscriber ended service |
| 1.52 | CHURN_REASON_CD | Indicates customer's reason for churning |
| 1.53 | THIRTY_DAY_CHURN_FLAG | Indicates whether customer terminated their service within 30 days of this interaction |
| 1.54 | SIXTY_DAY_CHURN_FLAG | Indicates whether the subscriber terminated their service within 60 days of interaction |
| 1.55 | SURVEY_ID | Unique ID for customer satisfaction survey |
| 1.56 | OVERALL_SATISFACTION | Overall Satisfaction Rating from Customer Satisfaction Survey |

-continued

| Table of USAR Attributes for Warranty Interactions | | |
|---|---|---|
| ID | USAR Field Name | Description |
| 1.57 | ISSUE_RESOLUTION | Issue Resolution Rating from Customer Satisfaction Survey |
| 1.58 | KNOWLEDGEABLE | Agent knowledge assessment Rating from Customer Satisfaction Survey |

| Table of USAR Attributes for Network Ticket Management System Interactions | | |
|---|---|---|
| ID | USAR Field Name | Description |
| 1.00 | SBSCR_NBR | Unique subscriber number for each customer |
| 1.01 | CUST_SYS_CD | Indicates system used by customer to enter CTMS ticket |
| 1.02 | RPT_YR_MO_NBR | Month and Year Key |
| 1.03 | OBJ_ID | Object ID |
| 1.04 | TKT_NBR | Issue Ticket Number |
| 1.05 | TKT_DES | Issue Ticket Description |
| 1.06 | CREATE_DT | Creation Date |
| 1.07 | TKT_TYPE | Ticket Type |
| 1.08 | ERROR_TYPE_NME | Nomenclature of Error Type |
| 1.09 | MKT_NME | Market Zone area |
| 1.10 | PROD_MACID_ID | Product Identifier associated with a ticket |
| 1.11 | CAUSE_DES | Cause of service outage |
| 1.12 | DISP_DES | Disposition code |
| 1.13 | DEV_NME | Developer Name |
| 1.14 | PHN_NBR | Subscriber Phone number |
| 1.15 | ACCT_NBR | Billing Account Number |
| 1.16 | CVRG_STUS_DES | Coverage Status Description |
| 1.17 | EVDO_CVRG_NME | Coverage Network Name |
| 1.18 | CRETR_WRKGRP_NME | Agent Hierarchy or Workgroup |
| 1.19 | CLOS_DT | Issue Close Date |
| 1.20 | SMRY_TXT | Issue Outcome Summary Text |
| 1.21 | HNSET_MODEL_NBR | Handset model number |
| 1.22 | PROB_DES | Problem Description |
| 1.23 | USER_NOTE_TXT | Agent Text Notes |
| 1.24 | DATE_KEY | date month and year of the transaction |
| 1.25 | MONTH_KEY | Month and year of transaction |
| 1.26 | RowIndex | Unique identifier for each interaction within a resolution block |
| 1.27 | BlockIndex | Unique number for each block of interactions; all interactions in a block will have the same BlockIndex |
| 1.28 | FIRST_CONTACT_FLAG | Indicates whether this was the first interaction in the block |
| 1.29 | RESOLVED_FLAG | Flag indicator for resolution in a block |
| 1.30 | CONTACT_SEQUENCE_NUMBER | Indicates location of the interaction in the block by sequence of interactions |
| 1.31 | CONTACTS_IN_BLOCK | Indicates number of interactions in the block |
| 1.32 | TIME_TO_NEXT_CONTACT_HOURS | Time between this interaction and next interaction in the block |
| 1.33 | TIME_SINCE_PREVIOUS_CONTACT_HOURS | Time since previous contact in the block |
| 1.34 | ARPU | Average Revenue Per User |
| 1.35 | CONTRACT_START_DATE | Contract Start Date |
| 1.36 | CONTRACT_END_DATE | Customer contract end date |
| 1.37 | PCE_IN_DAYS | Days left in contract counting from date of interaction |
| 1.38 | DEV_EFF_DT | Indicates date that device was activated on account |
| 1.39 | DEV_SKU_NBR | Device SKU Number |
| 1.40 | LIAB_CD | Liability Code |
| 1.41 | ACCT_SIZE_CD | Number of subscribers on a billing account number |
| 1.42 | ACCT_TYPE_CD | Account Network Type (IDEN/CDMA) |
| 1.43 | CREDIT_CLASS_CD | code for the customer credit class |
| 1.44 | PORT_IN | Indicates whether the subscriber ported their number to service provider |
| 1.45 | PORT_OUT | Indicates whether the subscriber ported their number from service provider when subscriber churned |
| 1.46 | SRVC_STRT_DT | Customer Churn Date |
| 1.47 | SBSCR_TRMTN_DT | Day and Year the subscriber ended service |
| 1.48 | CHURN_REASON_CD | Indicates customer's reason for churning |

Table of USAR Attributes for Network Ticket Management System Interactions

| ID | USAR Field Name | Description |
|---|---|---|
| 1.49 | THIRTY_DAY_CHURN_FLAG | Indicates whether customer terminated their service within 30 days of this interaction |
| 1.50 | SIXTY_DAY_CHURN_FLAG | Indicates whether the subscriber terminated their service within 60 days of interaction |

Figure 9C:
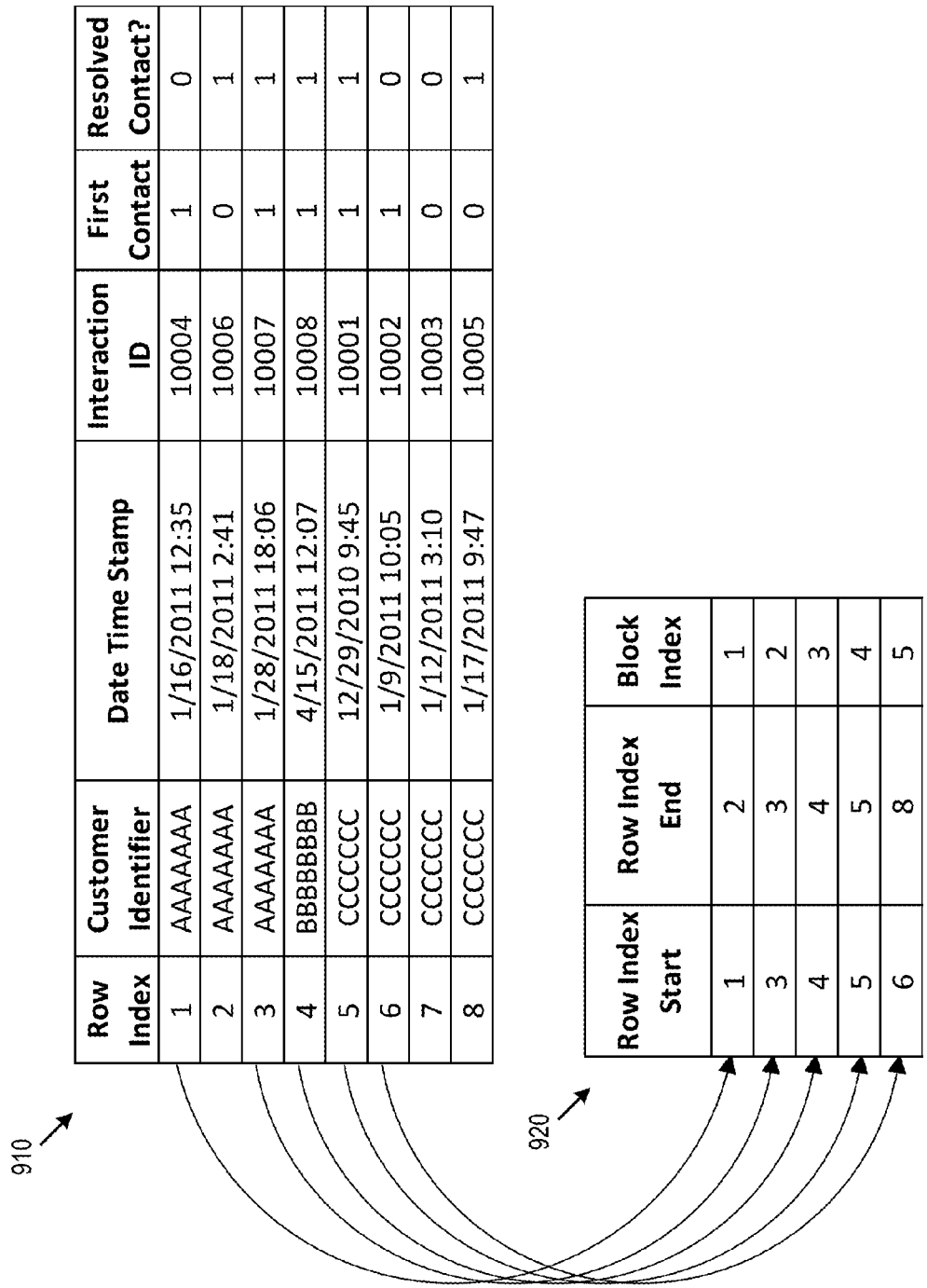
FIG. 9 shows a USAR that a churn analysis system may implement.

FIGS. 9a, 9b, 9c, and 9d show exemplary steps for creating a USAR. As shown in FIG. 9a, in an embodiment, the system 130 may create a USAR by creating a first dataset 910 by extracting key fields from customer interaction data, such as interaction attributes and metrics, in the customer interaction database 120. The key fields may include, for example, a unique customer identifier, a date time stamp for each interaction, and a unique identifier for each interaction. Then, as shown in FIG. 9b, the system 130 may sort the interaction records by customer, using the customer identifier field, and chronologically sort, using the date and time stamp for each interaction, the interactions for each customer. As shown in FIG. 9b, the system 130 may assign to each record in the first dataset 910 a unique row index number, starting from 1 and ending at N, where N is the total number of interaction records. As shown in FIG. 9c, the system may add a first contact field the first data set 910 to describe the corresponding interaction as a first contact (by assigning a value of 1) or a resolved contact (by assigning a value of 0) according to the algorithm of FIG. 7. The system may further add a resolved contact field to the first database 910 to describe the corresponding interaction as a resolved contact (by assigning a value of 1) or an unresolved contact (by assigning a value of 0), according to the algorithm of FIG. 8.

As shown in FIG. 9c, the system 130 may create a second dataset 920 that includes the row index value for all first contact interaction records from the first dataset. The system 130 may label the row index values as "row index start" in the second dataset 920 and sort the values from smallest to largest. Then, the system 130 may assign a block index value for each row index start, beginning with 1 for the smallest row index start, and ending with M, where M equals the total number of records, or first contact interaction records, in the second dataset. The system 130 may also assign a "row index end" value to each record in the second dataset 920, where the row index end value is defined as the minimum row index for all resolved contacts from the first dataset that is greater or equal to the row index start value of the record in the second dataset. Then, the system 130 may assign a block index value from the second dataset 920 to each record in the first dataset 910 where the row index value is between the row index start value and row index end value in the second dataset 920. For example, in FIG. 9c, a block index value of 1 from the second dataset 920 is assigned to all records in the first dataset that have a row index value of 1 or 2.

Figure 10:
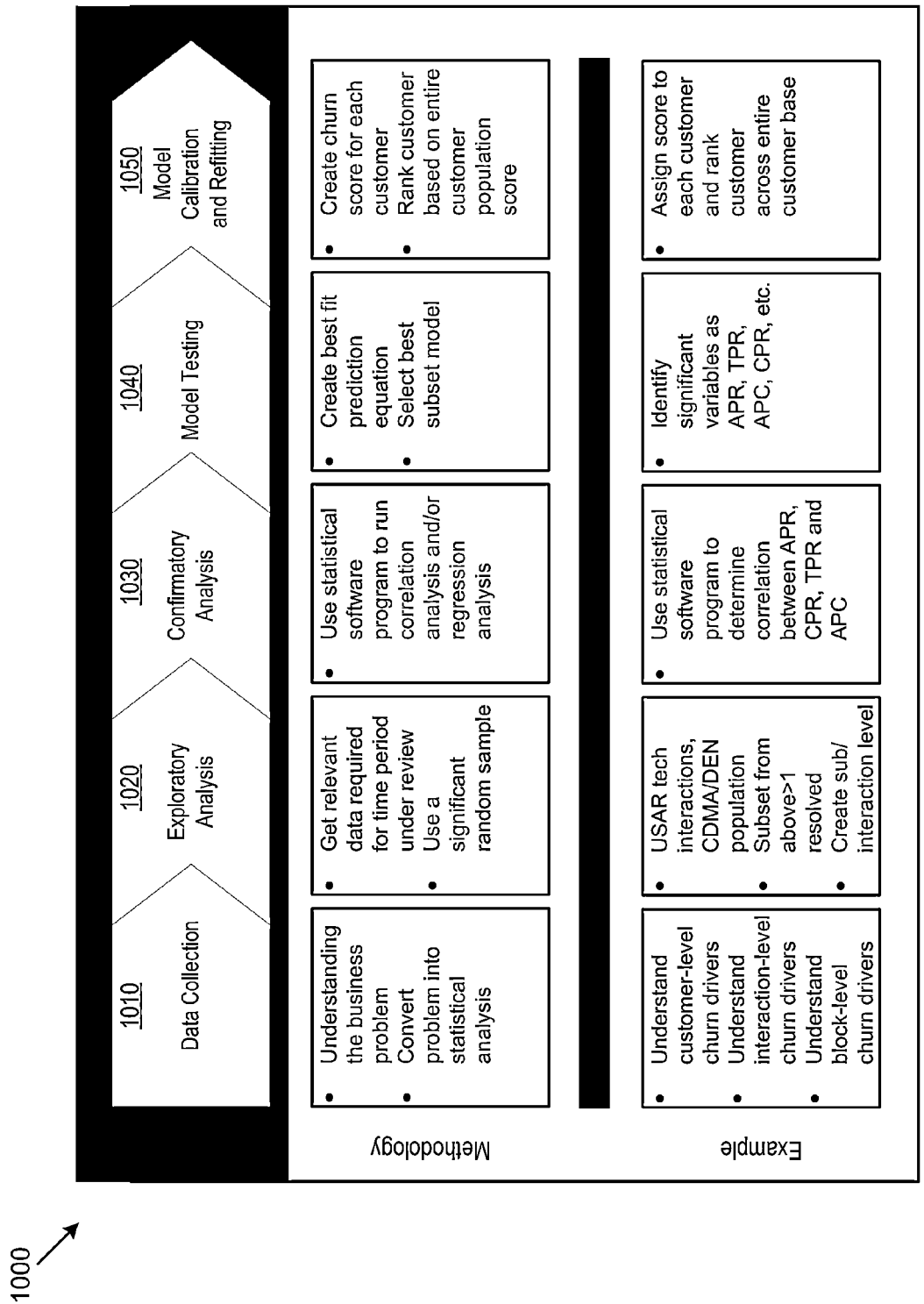
FIG. 10 shows a process for creating a churn prediction model.

FIG. 10 shows an exemplary process that the churn analysis system 130 may implement for creating a churn prediction model. The process may include a data analysis step 1010, an exploratory analysis (correlation and factor analysis) step 1020, a confirmatory analysis (logistic regression) step 1030, a model testing (statistics significance) step 1040, and an iterations and predictions step 1050. The churn analysis system 130 may use a commercially available statistical software, such as IBM's Statistical Package for the Social Sciences (SPSS) to perform data analysis step 1010, exploratory analysis (correlation and factor analysis) step 1020, confirmatory analysis (logistic regression) step 1030, and model testing (statistics significance) step 1040. The Statistical Package may include, for example, IBM SPSS 20, IBM SPSS Advanced Statistics 20.0, IBM SPSS Bootstrapping 20.0, IBM SPSS Categories 20.0, IBM SPSS Complex Samples 20.0, IBM SPSS Conjoint 20.0, IBM SPSS Custom Tables 20.0, IBM SPSS Data Preparation 20.0, IBM SPSS Decision Trees 20.0, IBM SPSS Direct Marketing 20.0, IBM SPSS Exact Tests 20.0, IBM SPSS Forecasting 20.0, IBM SPSS Missing Values 20.0, IBM SPSS Neural Networks 20.0, IBM SPSS Regression 20.0. Alternatively, the churn analysis system 130 may use other commercially available or custom programmed statistical software to create a churn prediction model.

In step 1010, data analysis may comprise collecting data regarding cross-channel interactions and attributes from a USAR; segmenting churn pockets; classifying customers by binary assignments, such as 1 for churned customers and 0 for current customers; and determining cross-channel USAR metrics related to customers/subscribers, blocks, channels, or interactions. The metrics may include, for example, Agents Per Call, Agents Per Resolution, Contacts Per Resolution, and/or Time Per Resolution. The data collected from the USAR may vary depending on business objectives and channels of interaction. Segmenting churn pockets may comprise identifying a combination of one or more block attributes or interaction attributes, which, when analyzed together, correlate with a particularly high or low churn rate. The churn analysis system 130 may segment churn pockets according to other metrics or attributes disclosed, or any other metrics or attributes that may be relevant to churn analysis. The churn analysis system 130 may derive or calculate metrics, such as cross-channel USAR metrics, from interactions that occur through more than one channel of interaction.

The data analysis of step 1010 may provide understanding of business problems and enable conversion of problems into statistical analysis. For example, step 1010 may provide an understanding of subscriber-level churn drivers, interaction-level churn drivers, and block level-churn drivers. Subscriber-level churn drivers may include, for example, subscriber attributes, such as, the subscriber's age, income level, geographic location or marriage status. Interaction-level and block-level churn drivers may include, for example, interaction attributes as shown in the tables above and below.

In step 1020, exploratory analysis may comprise correlation analysis and factor analysis. This step may comprise analyzing, based on historical data, channel-specific attribute correlations; cross-channel attribute correlations; channel-specific attribute principle components; and cross-channel attribute components. Channel-specific attribute correlation analysis may comprise determining whether independent channel-specific attributes affect churn rate. Examples of channel-specific attributes may include: number of visits to a store per block (for retail store interactions), number of calls per block (for a technical support call center), or number of views per page (for website interactions). The system may determine, for example, that the number of calls per block has a positive correlation with churn rate. The system may utilize a statistical analysis software program, such as SPSS, to determine correlations for each attribute. Cross-channel attribute correlation analysis may similarly comprise determining whether independent cross-channel attributes, such as number of interactions per block or number of agents per block, affect churn rate.

Channel-specific attribute principle component analysis may comprise determining the relative weight of each channel-specific attribute with respect to its effect on churn rate. In other words, this analysis may include comparing the effect of one channel-specific attribute to the effect of another channel-specific attribute and determining which attribute has a greater effect on churn rate. The system may use a statistical analysis software program to determine the relative effect, or the appropriate weight of each channel-specific attribute.

Cross-channel attribute component analysis may comprise determining the relative weight of each cross-channel attribute with respect to its effect on churn rate. In other words, this analysis may include comparing the effect of one cross-channel attribute to the effect of another cross-channel attribute and determining which attribute has a greater effect on churn rate. The system may use a statistical analysis software program to determine the relative effect, or the appropriate weight of each cross-channel attribute.

In step 1030, confirmatory analysis may comprise using logistic regression, or Cox regression, to confirm the correlations determined in step 1020. Logistic regression may comprise: classifying customers as churned or current customers; extracting data for a statistically representative sample of customers to be used as a test population (e.g., 20% of population of churned and current subscribers); extracting data for a statistically representative sample of customers to be used as a control population (e.g., 20% of population of churned and current subscribers); using USAR metrics as independent variables to predict subscriber churning status (1 or 0), as a dependent variable; performing analyses to create a best fit equation with coefficients, or independent variables, explaining customer churn, or dependent variables; verifying that the coefficients meet significance criteria, which may be 0.5 or another value determined from the type of regression used; verifying that the overall model diagnostics and statistics are within acceptance criteria, which may be subjective to the sample and nature of data. As an example, a dependent variable when predicted, will give an outcome of 0 or 1 representative of subscriber classification. As another example, a best fit equation, when created, will classify a subscriber as 1 or 0, based on the interaction and relationship with the independent variables, or metrics. The churn analysis system 130 may use logistic regression to predict future classification of subscribers based on the cross-channel experience attributes.

In step 1040, model testing may comprise testing a model for accuracy and calibrating the model, which helps to ensure that the model effectively predicts customer propensity to churn, or other statistics of interest to a service provider. Key criteria are evaluated to create a measure of competency and accuracy. For example, the system 130 may use a Likelihood-Ratio Test to test for overall model fit at a levered significance of 0.05. Additionally or alternatively, the system 130 may use a Wald Test to test for the relationship between experience attributes (e.g. time to resolution) and the churn outcome at a levered significance of 0.05; or a Score Test to test for acceptance of a variable into the churn model. The system may also perform residual testing and variance analysis to test a model for accuracy and to calibrate the model. Block level metrics may be used in the correlation, regression, and churn propensity score development.

In step 1050, refitting or model scoring involves iterations of implementing changes and influences from the model testing step to ensure model accuracy. Overall, this step predicts classification of customers as future churners or not. Churners are classified as 1 and current customers as 0. The churn analysis system may apply a best fit equation to experience attributes in the form of, for example, $Log(P/(1-P))=Constant +B(x1)+B2(x2) \ldots Bz(xz)$, where P is a value between 0 and 1 representing the log odds ratio of churning, and B, B2, \ldots Bz are coefficients of the metrics. The churn analysis system 130 may apply metrics, including block metrics and interaction metrics, from the control population to the equation to determine whether the equation accurately classifies subscriber status. Then, the system may run analysis to create a best fit equation with coefficients explanatory of customer status based on experience attributes. As an example, the dependent variable when predicted, may give an outcome of 0 or 1 representative of customer classification. As another example, the dependent variable, when predicted, will give a log odds ratio between 0 and 1 as subscriber classification. Finally, normalizing all CCI scores from the customer base may create quartile estimates of customers at risk of churning. Model scoring may further comprise block analysis, random sample generation, testing subset designs (e.g., creating churn and active groups for testing and trending), correlation analysis (identify, verify, and refine experience drivers), hypotheses development (identify initial drivers for testing), regression analysis (validating drivers thru initial robust response analysis), and model evaluation (residual analysis and model testing).

The churn prediction model 140 may provide a method for evaluating a customer's propensity to churn by deriving a customer churn index (CCI) through a statistical equation. The model may comprise an optimized equation that assigns a CCI score to each individual customer, where the CCI score reflects causative interactions between churn and historical data and may also reflect churn propensity. The churn prediction model 140 may comprise, for example, a linear equation created by analyzing a combination of variables representing customer, channel and experience attributes. The churn analysis system may use the linear equation to assign a CCI score between 0 and 1 (a churn propensity scale where 0 and 1 are least and highest churn risks respectively) to each customer. The CCI score for an individual customer shows how the factors that affect the customer's decision to churn combine to create a greater or lesser churn propensity.

The CCI scores for individual customers may also be accumulated, averaged, and otherwise manipulated to reveal trends in the behavior of individual customers and groups of customers. This may enable a service provider, for example, to predict which customer or group of customers has a high propensity to churn. The churn analysis system may examine causative relationships underlying the predictive model to determine which attributes drive the highest CCI scores. This may provide a more targeted ownership process to addressing issues of churn.

The churn analysis system may provide customer service representatives with an individual customer's CCI score while speaking with the customer. This may alert the representative of customers with high CCI scores and allow the customer service representative to respond more appropriately to prevent the customer from churning.

The composite of CCIs for an entire population of customers may provide a method for determining the propensity to churn for the entire customer base. Therefore, an enterprise-wide CCI can provide a good measure of the overall health and effectiveness of churn prevention activities.

In an example of an implementation of the system and methods disclosed, a user may use the system to perform an iterative process of identifying, prioritizing, and testing hypotheses. A user may use the system to perform multiple analyses to identify churn reduction opportunities at a telecommunications service provider (Telco), including: identification of major device issues (as shown in FIG. 11, discussed in more detail below); channel ping pong analysis (as shown in FIG. 12, discussed in more detail below); agent ownership analysis (as shown in FIG. 13, discussed in more detail below); and early device education experience (as shown in FIG. 14, discussed in more detail below).

Figure 11:
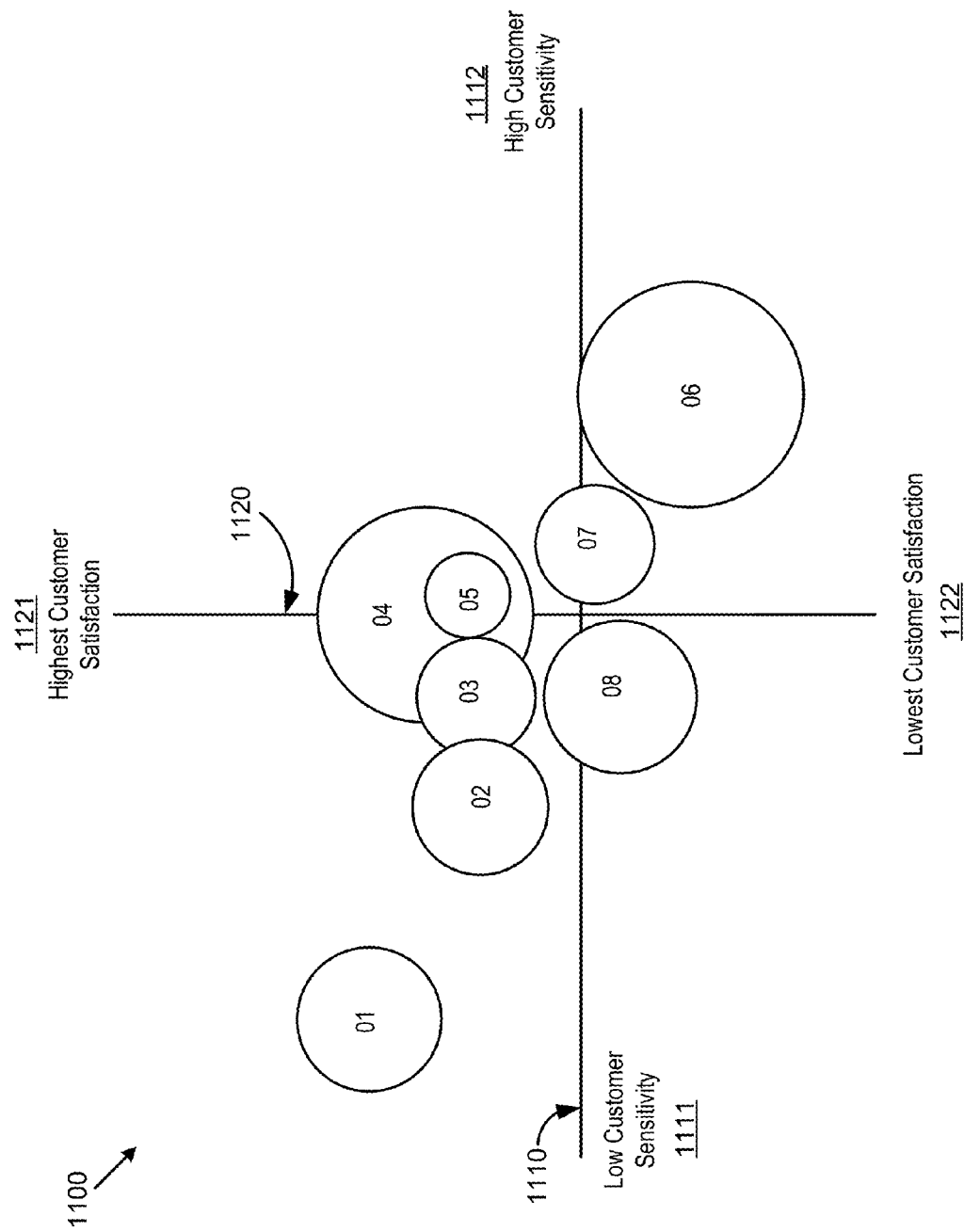
FIG. 11 shows a graphical report of churn analysis results from an implementation of a churn analysis system.

FIG. 11 shows exemplary results 1100 from identification of major device issues experienced by customers of a Telco. Major device issues may correspond with, for example: software updates 1101, network coverage 1102, web browsing 1103, charging failure 1104, data cards 1105, touchscreens 1106, text messaging 1107, and battery failure 1108. The size of a bubble indicates the percentage of customers who churned after experiencing a given device issue. For example, customers who experience device issues associated with touchscreens, charging failures, and software updates exhibit the highest level of churn. The location of a bubble along the horizontal axis 1110 indicates Customer Sensitivity, or the likelihood of a customer to respond to a customer satisfaction survey after experiencing a given device issue, with the left end 1111 of the axis representing the least likely to respond and right end 1112 of the axis representing the most likely to respond. The location of a bubble along the vertical axis 1120 indicates level of customer satisfaction for customers who actually responded to a customer satisfaction survey, with the top 1121 of the axis representing the lowest average satisfaction ratings and the bottom 1122 of the axis representing the highest average satisfaction ratings. For example, customers with software updates 1101 exhibit the least likelihood to respond to a customer satisfaction survey.

Figure 12:
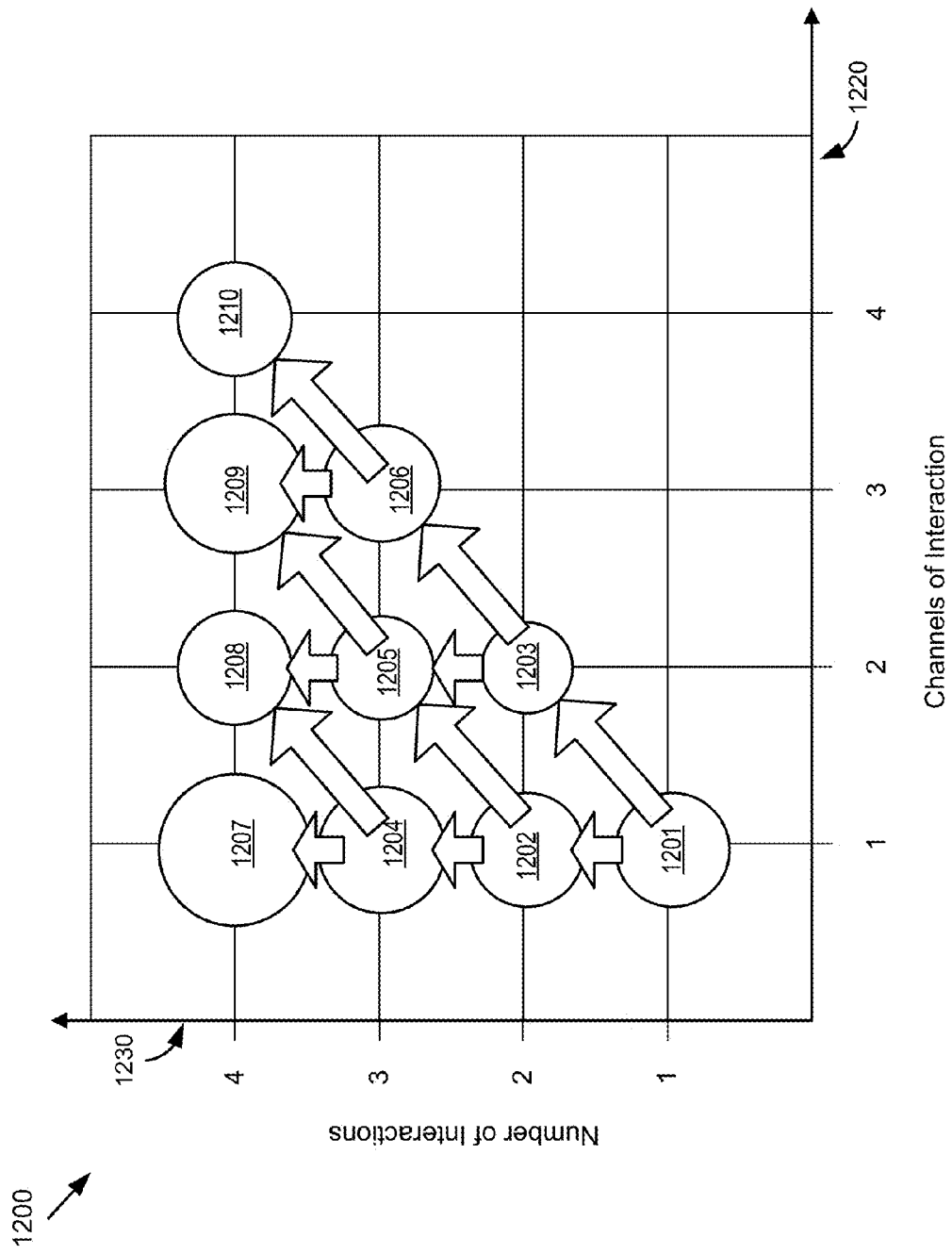
FIG. 12 shows churn analysis results from a channel ping pong analysis.

FIG. 12 shows exemplary results 1200 from a channel ping pong analysis using the churn analysis system disclosed. The horizontal axis 1220 represents number of channels per block, increasing from left to right. The vertical axis represents number of interactions per block, increasing from bottom upwards. Each of the bubbles, 1201 to 1210, represents a churn rate for a particular customer segment or experiential segment. For example, bubble 1207 represents a segment of customers who had four interactions, all interactions within one channel. Bubble 1206 represents a segment of customers who had 3 interactions across three channels of interaction. The size of each bubble represents a 60-day churn rate, which indicates the percentage of customers who churned within 60 days of the last interaction in a block. As seen in FIG. 12, the size of bubbles 1201, 1202, 1204 and 1207 generally increase with the number of interactions. In comparison, the size of bubbles 1207, 1208, 1209 and 1210 do not consistently increase with the number of channels of interaction. Thus, in this example, churn rates increase more dramatically with increasing number of contacts than it does with increasing number of channels.

Figure 13:
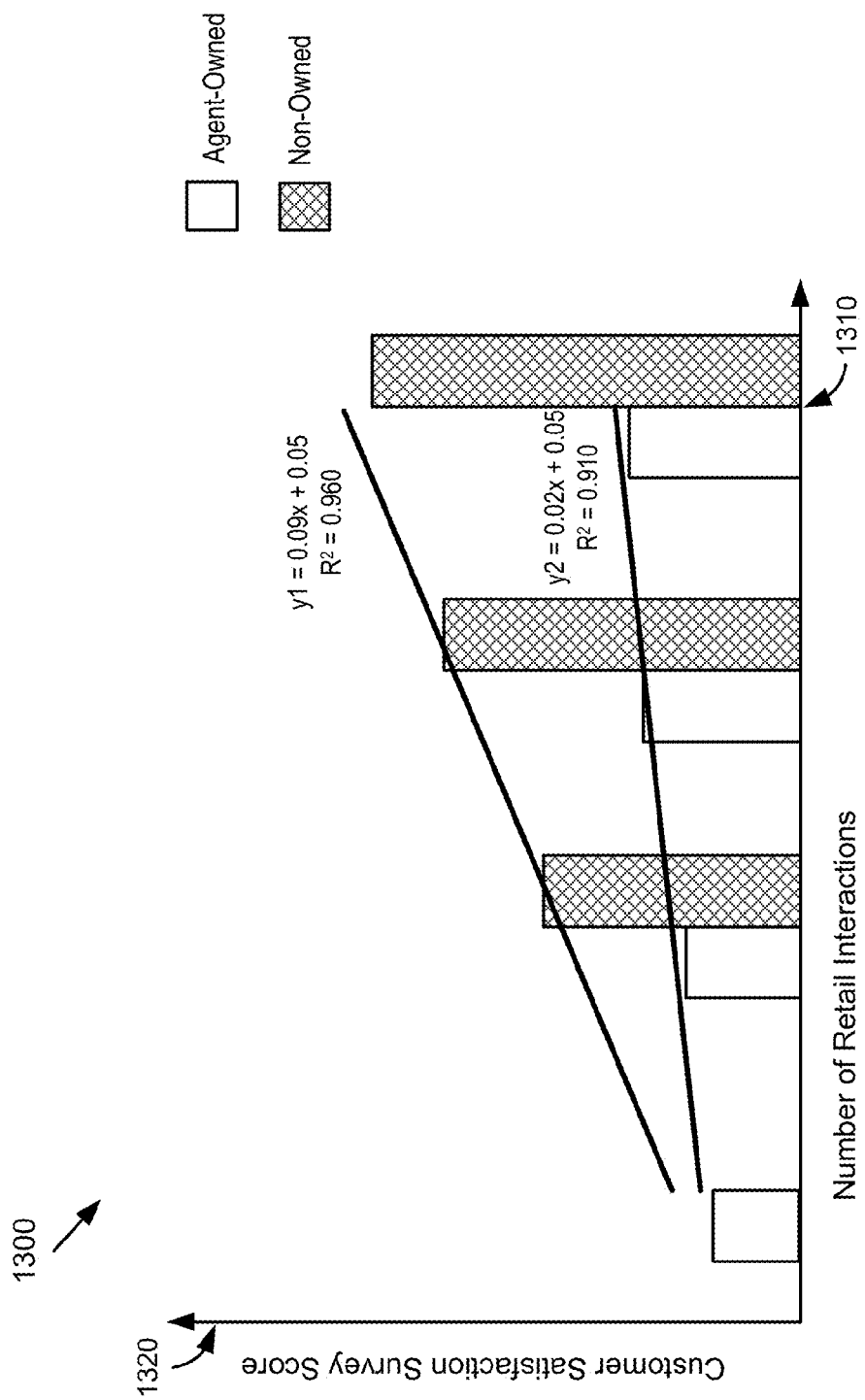
FIG. 13 shows linear regression from churn analysis results from an implementation of a churn analysis system.
Figure 14:
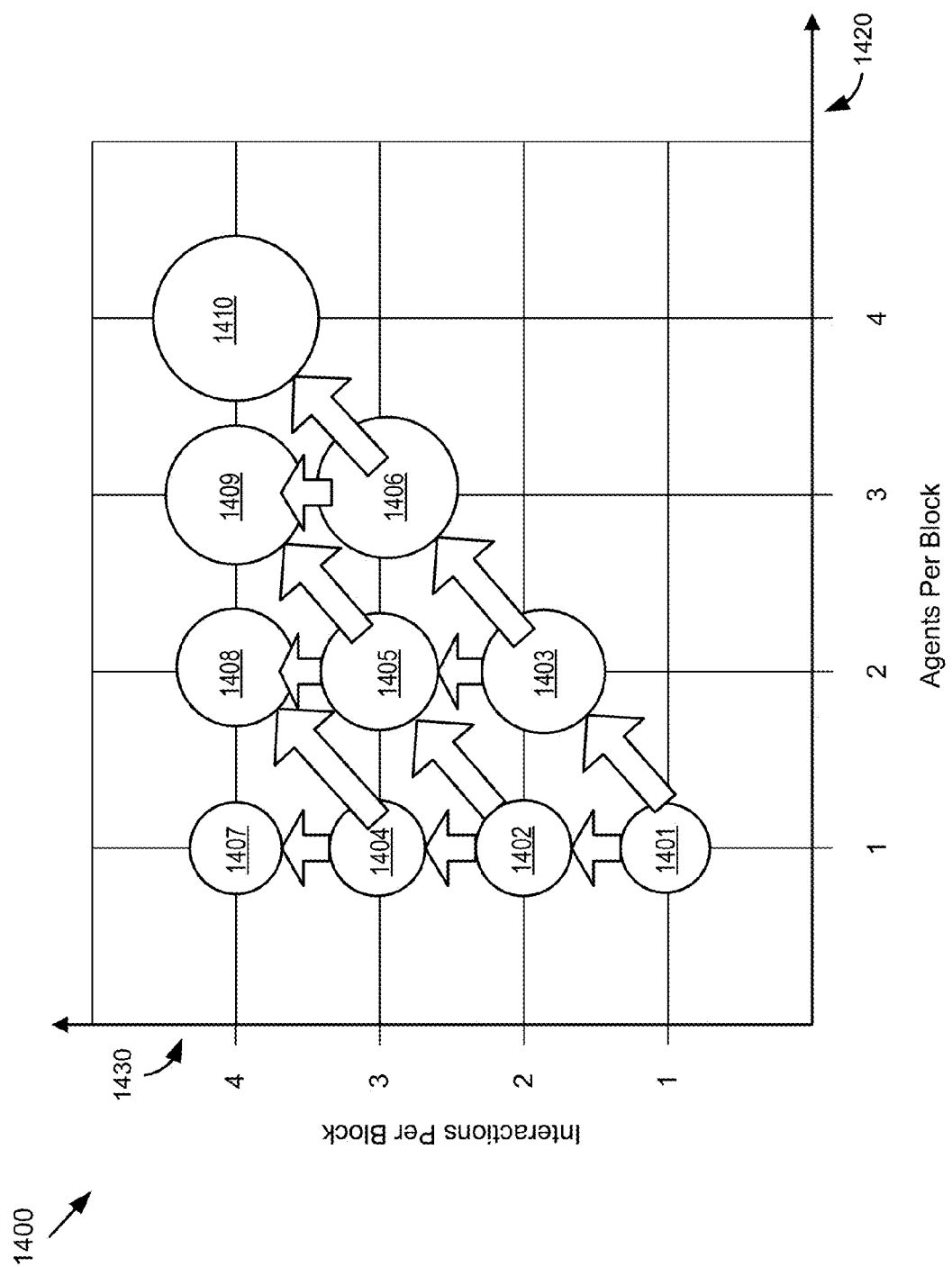
FIG. 14 shows churn analysis results from an implementation of a churn analysis system in Ownership analysis.

FIG. 13 shows exemplary results 1300 of linear regression using the churn analysis system disclosed. The horizontal axis 1310 represents total number of interactions per block, increasing from left to right. The vertical axis 1320 represents customer satisfaction survey scores decreasing from the bottom upwards. The solid bars represent churn rate of agent-owned blocks, or blocks in which all interactions were with the same agent. The cross-hatched bars represent churn rate of non-owned blocks, or blocks in which interactions were handled by more than one agent. The trend lines show a clear correlation between customer satisfaction survey scores and ownership. In this example, customer dissatisfaction increases at a rate of 9% with non-owned blocks and a rate of only 2% with agent-owned blocks. The R-squared value represents a coefficient of determination, which indicates ability of the linear model to predict customer satisfaction based on number of retail contacts in agent-owned and non-owned blocks. An R-squared values of 0.960 and 0.092 indicates that the model is able to predict with 96% accuracy the customer satisfaction level of a customer who had three interactions with different agents, and 92% accuracy the customer satisfaction level of a customer who had three interactions with the same agent. FIG. 13 also shows that customers interacting with different agents across multiple interactions are more dissatisfied than customers interacting with only one agent across multiple interactions. Thus, a service provider looking at these results may have incentive to train or reward retail employees to direct customers to agents with whom the customer has had previous interactions. The system may perform similar linear regressions with additional or alternative interaction and block metrics or attributes to identify other opportunities to reduce churn.

FIG. 14 shows an exemplary Ownership analysis 1400. The horizontal axis 1410 represents totally number of agents per block, increasing from left to right. The vertical axis 1420 represents total number of contacts per block, increasing from the bottom upwards. The size of each of the bubbles, 1401 to 1410, represents a 60-day churn rate. In this example, the sizes of bubbles 1401, 1402, 1404, and 1407 increase only a small amount with the number of interactions per block for blocks involving only one agent, with 1401 being the smallest. In comparison, the size of bubbles 1407, 1408, 1409 and 1410 increase consistently and significantly with the total number of agents per block for blocks involving four interactions. Thus, the results show that churn rates increase dramatically with increasing number of agents for multiple interactions in Customer Care, Retail, and Tech Support.

Figure 15:
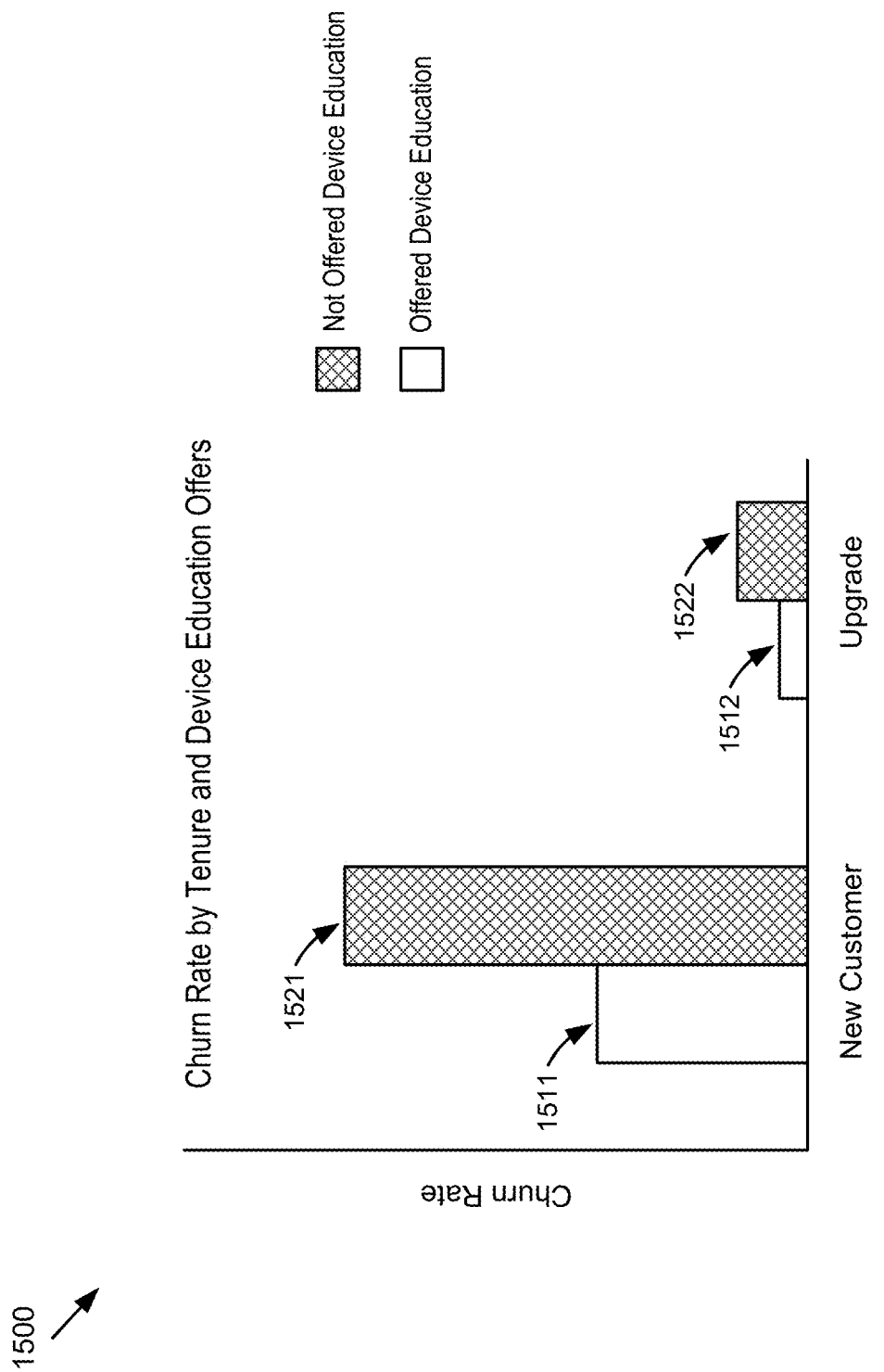
FIG. 15 shows a graph comparing churn rates.
Figure 16:
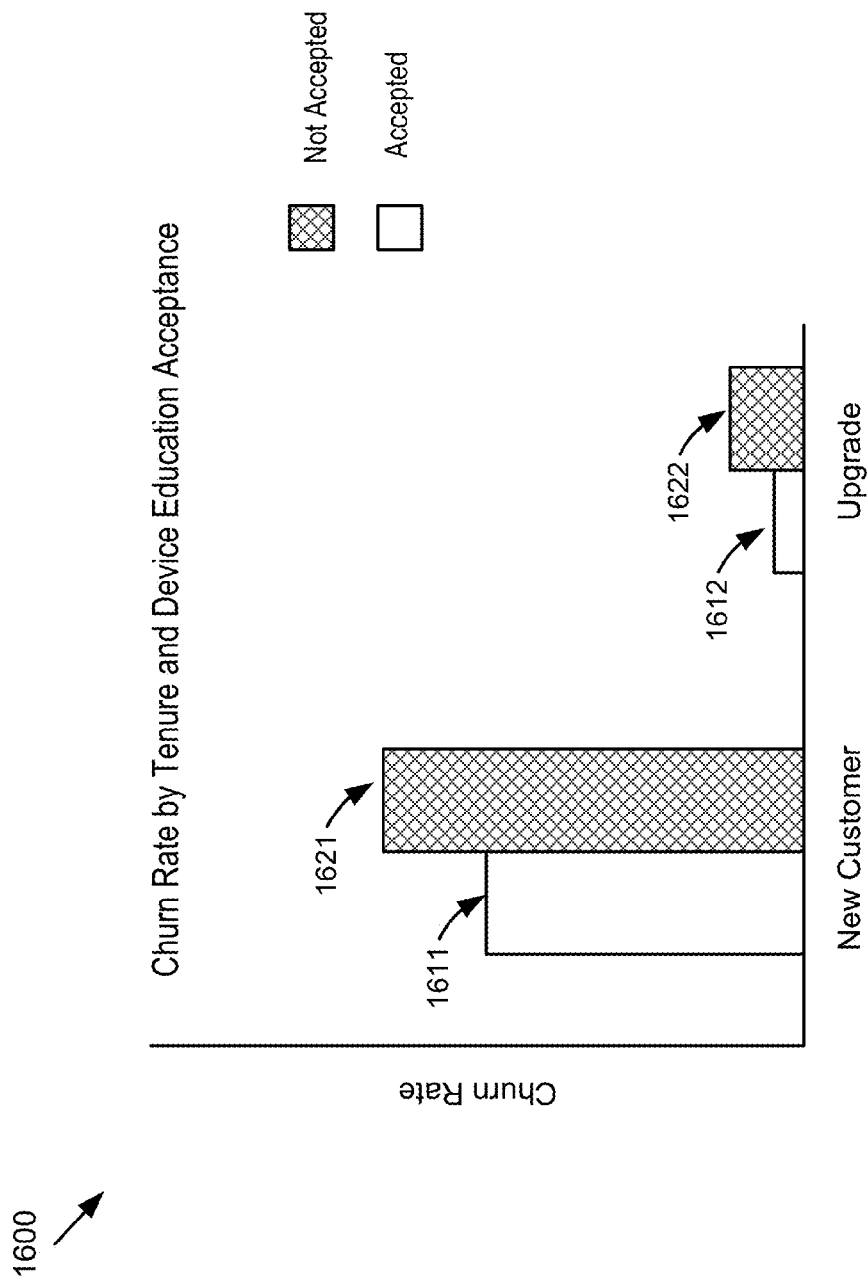
FIG. 16 shows a graph comparing churn rates.
Figure 17:
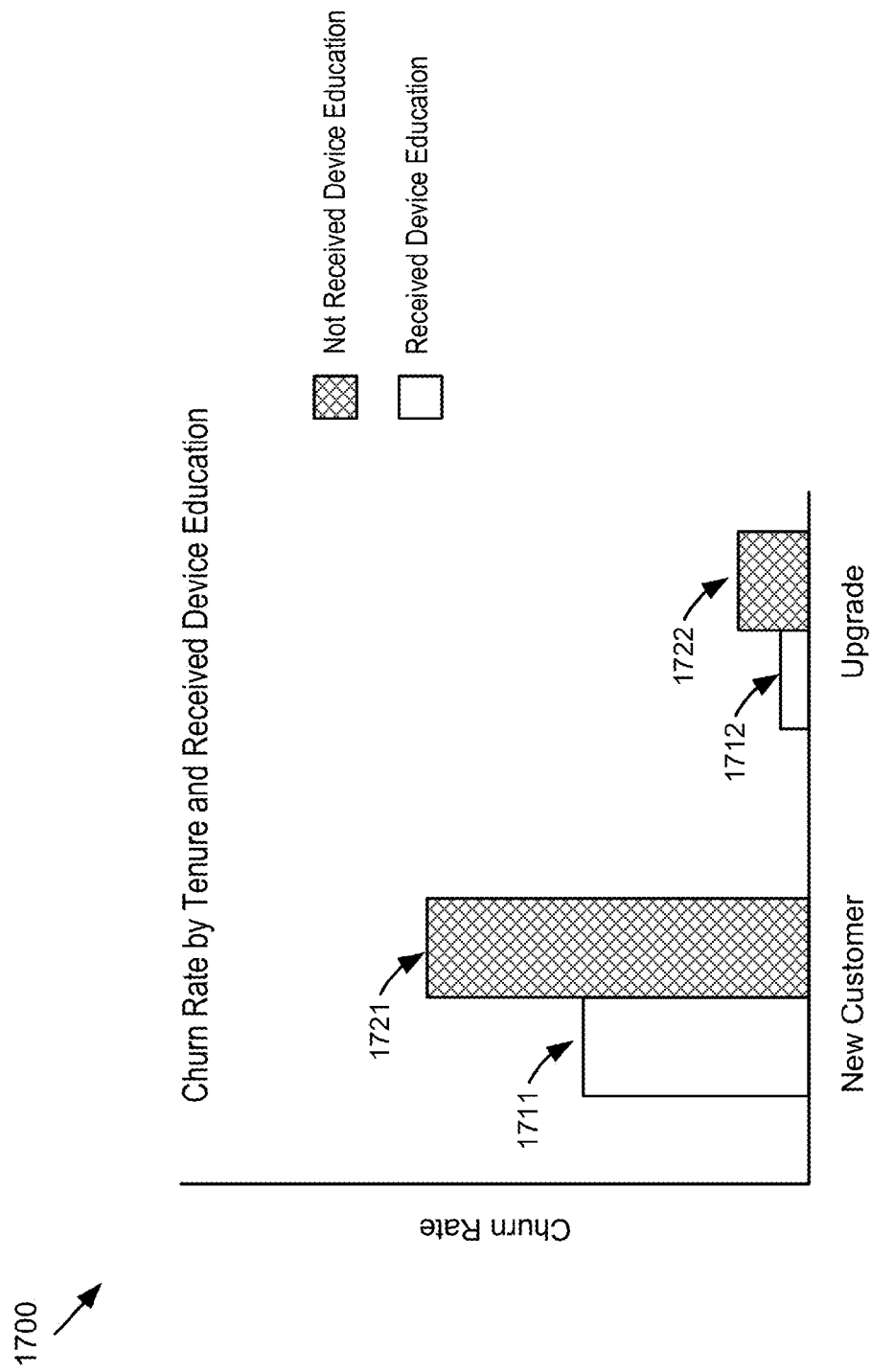
FIG. 17 shows a graph comparing churn rates.

FIGS. 15 through 17 show charts 1500, 1600, and 1700 of exemplary data identifying opportunity for implementing a customer retention program. In this example, customer interaction data was tracked to identify customers to whom device education was offered.

FIG. 15 shows a graph 1500 comparing churn rates of customers who received device education against customers who were not offered education. The solid bars 1511 and 1512 represent churn rate of customers who were offered device education, and the cross-hatched bars 1521 and 1522 represent churn rate of customers who were not offered device education. The results are further categorized by customer tenure (new customers versus existing customers receiving new devices through upgrades).

FIG. 16 shows a graph 1600 comparing churn rates of customers who accepted device education against customers who did not accept device education. The solid bars 1611 and 1612 represent churn rate of customers who accepted device education, and the cross-hatched bars 1621 and 1622 represent churn rate of customers who did not accept device education.

FIG. 17 shows a graph 1700 comparing churn rates of customers who actually received device education against customers who did not receive device education. The solid bars 1711 and 1712 represent churn rate of customers who actually received device education, and the cross-hatched bars 1721 and 1722 represent churn rate of customers who did not receive device education Graphs 1500, 1600 and 1700 indicate that customers who are offered, who accept and/or who actually receive device education are less likely to churn. Based on these results, a service provider may develop a pilot to offer and provide customers with device education.

A device education pilot may include, for example, branding the customer experience and defining separate experiences for a unique set of customers. Device education may include, for example, instructions or assistance with device set-up and device operations. Basic device set-up education may include data and voice provisioning and validation, contacts transfer, and email set-up. Advanced device setup education may include basic device set-up education and SW updates and/or social network/apps set-up. Device operation education may include instructions or assistance with device operation. Basic device operation education may include ensuring that a customer knows how to make calls, and check voice mail and email. Consultative device operation education may include basic device operation education and an overview of device options. Heavy device operation education may include basic device operation education and a walk-through of how to maximize device performance, tri-age, device difference, how to "Get more out of your device," and self help options.

The channels, through which device education may be provided, may vary or may be customized based on a customer's level of knowledge and experience with respect to device set-up and device operation. The pilot may also offer remote access set-up alternatively or in addition to device education. Device education may be provided, for example, through flyers or other printed materials, emails, web application instant messages, or websites. Implementation of the pilot may include, for example, training and branding agents as device education experts, implementation of performance management initiatives, and completing customer surveys to monitor branding, device education offer rate, and device education acceptance. Customer surveys may be provided through SMS, websites, social media or other channels of interaction.

The system may use a USAR to create a prioritization model based principle factors to measure cost of a "failure point" where resolution was not achieved. Three factors may include, for example, Customer Satisfaction, Customer Sensitivity; and Impact/Cost of Resolution. The prioritization model may continuously gauge the health of a customer retention program based on identifying which customers are satisfied, which customers are motivated to respond to a survey, and where a business fails to resolve a customer's issue. The system may use these measures to gauge customer pain or dissatisfaction and prioritize opportunities for transformation. The opportunities may include areas where customers are dissatisfied, highly motivated to respond to an experience or interaction, and the impact and/or cost is high.

Figure 18:
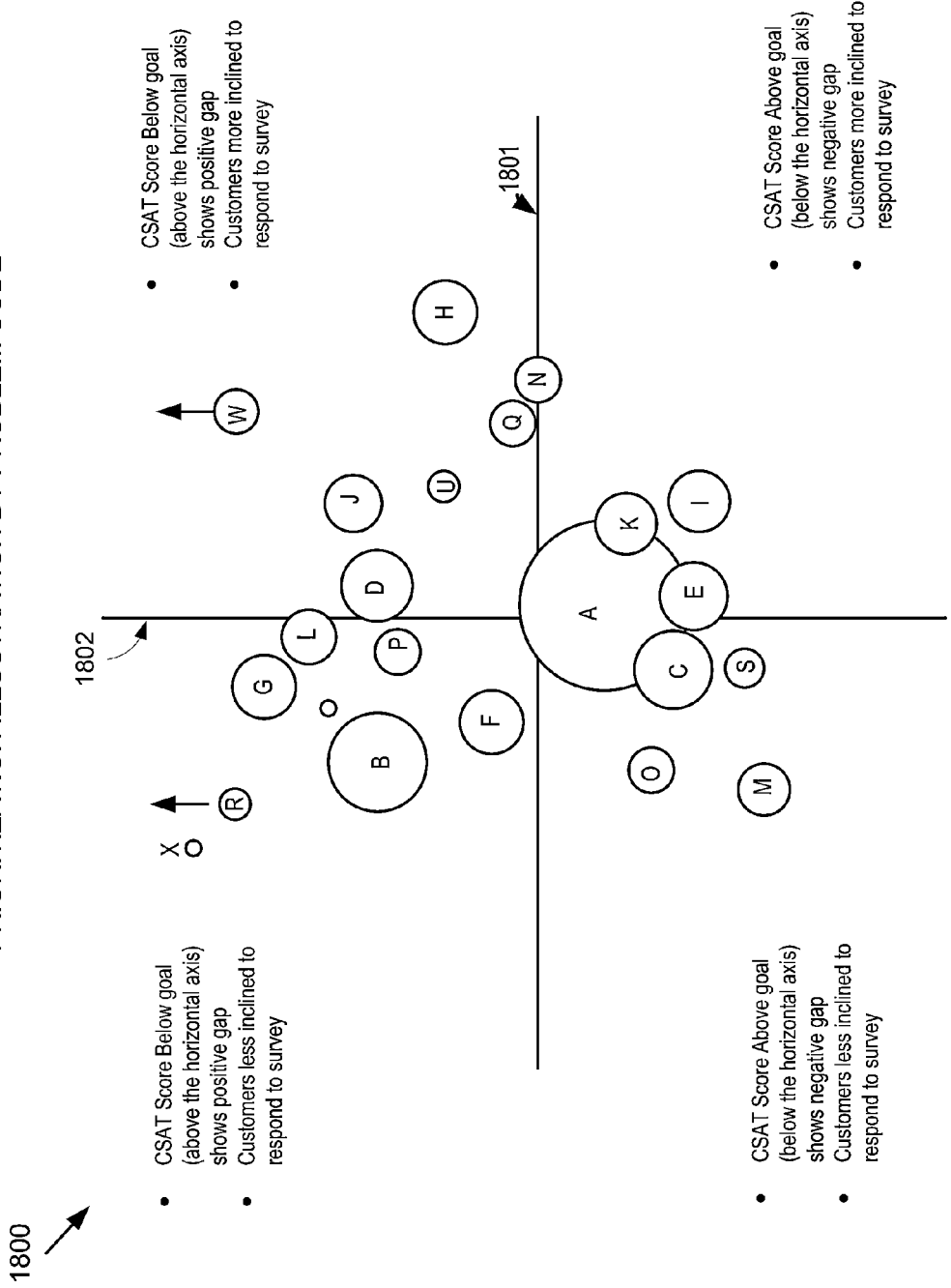
FIG. 18 shows a prioritization model for identifying customer pain and impact.

FIG. 18 shows an exemplary prioritization model 1800 for identifying customer pain and impact. The horizontal axis 1801 represents customer sensitivity, which is a measure of customer inclination to respond to a customer satisfaction survey. The vertical axis 1802 represents CSAT Gap, which is a measure of the difference between actual customer satisfaction survey score and the target score. The bubbles represent different issues to be resolved, and bubble size indicates a volume of the total cost of resolving that issue. The churn analysis system 130 may create the prioritization model 1800 automatically from the USAR and may use the prioritization model 1800 to identify high priority initiatives. For example, the prioritization model 1800 indicates that customers having issue H are more inclined to respond to a customer satisfaction survey than customers having issue A. The prioritization model 1800 also indicates lower customer satisfaction scores for customers having issue H than the customers having issue A, but that the cost of resolving issue A is much greater than the cost of resolving issue H. Therefore, issue H should have greater priority than issue A because resolving issue H would resolve greater customer pain at a lower cost than would be required for resolving issue A.

In another example of an implementation of a churn analysis system, the system may use a USAR to evaluate the efficacy of a major desktop tool utilized by front end technical support call center agents for troubleshooting issues. The evaluation may involve determining information such as major inefficiencies in Average Handling Time and overall Minutes Per Resolution when the tool was used versus when the tool was not used for similar issues on calls. The system may analyze this information to establish a direct correlation of the tool usage rate to additional dispatches & escalations. Next, the system may complete an evaluation of the benefits for each call driver issue type within the call center and make precise recommendations as to which drivers the agents should continue usage of the tool and which drivers the agents should discontinue usage. The recommendation may be based on a balanced evaluation of costs both within and outside the call center as well as customer satisfaction.

In another example, Event-Based Tracking & Analysis in the USAR may enable a user to plan for several events occurring in the business and their effects on the Client's Customer Care Operation, such as Availability and Cost to Serve. The system may utilize the USAR to help determine precise impact, at the issue level, of areas affected by a major process shift imposed by the service provider. The system may create predictive models to pinpoint the effect of the process change on the entire network. Further analysis may prove large scale impacts of this process change to several contractual metrics, despite popular held beliefs to the contrary. Operation adjusted demand models may ensure availability of customer service representatives despite increased demand on their time given network changes.

Figure 19:
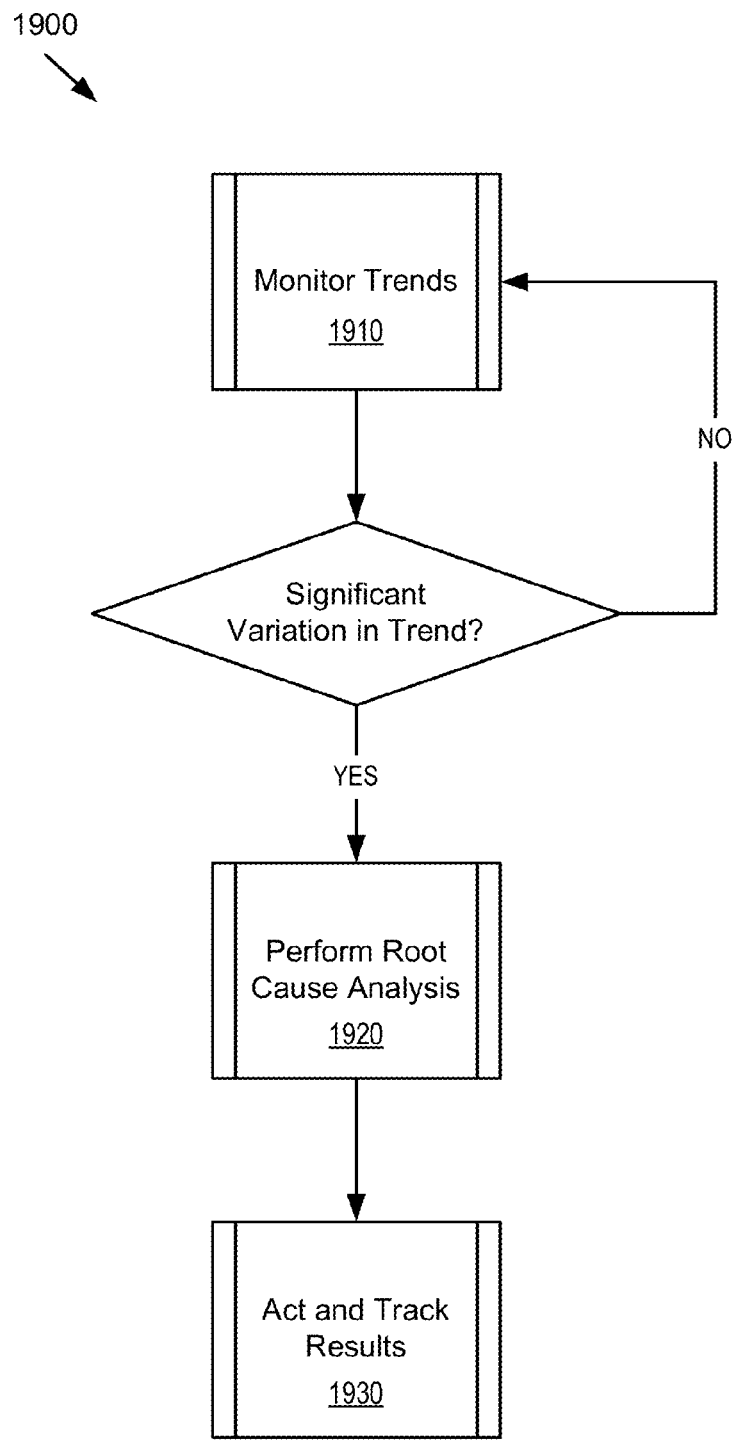
FIG. 19 shows a product-based analysis from implementation of a churn analysis system.

FIG. 19 shows an example of product-based analysis 1900 using the churn analysis system disclosed. A product-based analysis 1900 may include three steps: monitoring trends 1910, root cause analysis 1920, and implementation and results tracking 1930. For example, the system may continuously monitor a number of repeat contacts associated with a given problem code or reason code. The system may determine a rise in the number of repeat calls associated with a problem or reason code in a particular week. The system may perform root cause analysis to determine whether the actual cause of the rise in number of calls is due to a specific problem with a product or chance or some unidentified issue. The root cause analysis may involve looking at summarized data to identify, for example, a disproportionate number of calls related to a particular problem or reason code. Then, looking at a detailed view of the data may indicate that a particular product is driving repeat calls. The system may verify a hypothesis by showing that a high number of repeat contacts is associated with one specific type of the product. Data mining interaction data may provide visibility to a specific hardware component within the product and identify a flaw with that hardware. A solution for decreasing repeat calls may involve notifying agents of the steps to resolving the issue, and working with the product manufacture to fix the defect In another example of an implementation, the system may perform frequent caller analysis. The system may use a USAR to develop a business case for a solution to handle Frequent Callers, improving customer experience and resolution rate for dissatisfied customers. In analysis, the system may use the USAR to identify customers who called in frequently to a contact center, within a service provider specific criteria of frequency and time. The USAR may enumerate the impacts to Customer Satisfaction, Minutes into the center, and Customer Retention levels, based on case analysis on the calls generated by frequent callers. The findings from the analysis may result in a business case for an initiative allowing the service provider to benefit from a substantial savings per annum. An example of such initiative may be to create a specialized queue to enhance the customer experience for the most painful customers. Continued benefits in the Run Phase (or continued utilization of the USAR) may include, for example: Resolution Analysis by issue type allowed for detailed targeting and training of the queue on drivers where frontline agents typically struggle; and continued tracking of progress on an initiative, and setting targets in order to reward agent performance.

Figure 20:
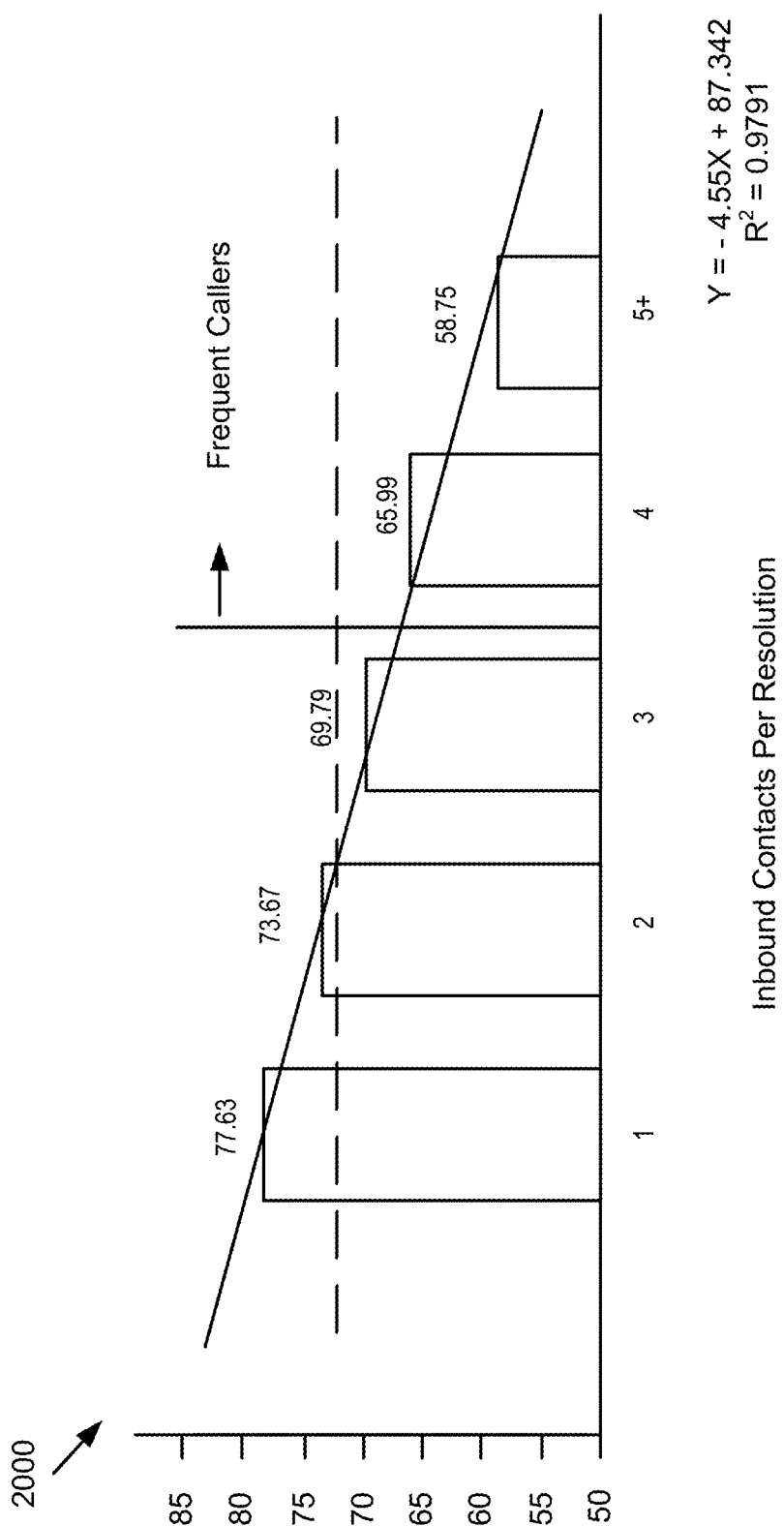
FIG. 20 shows a graph correlating inbound interactions per block.
Figure 21:
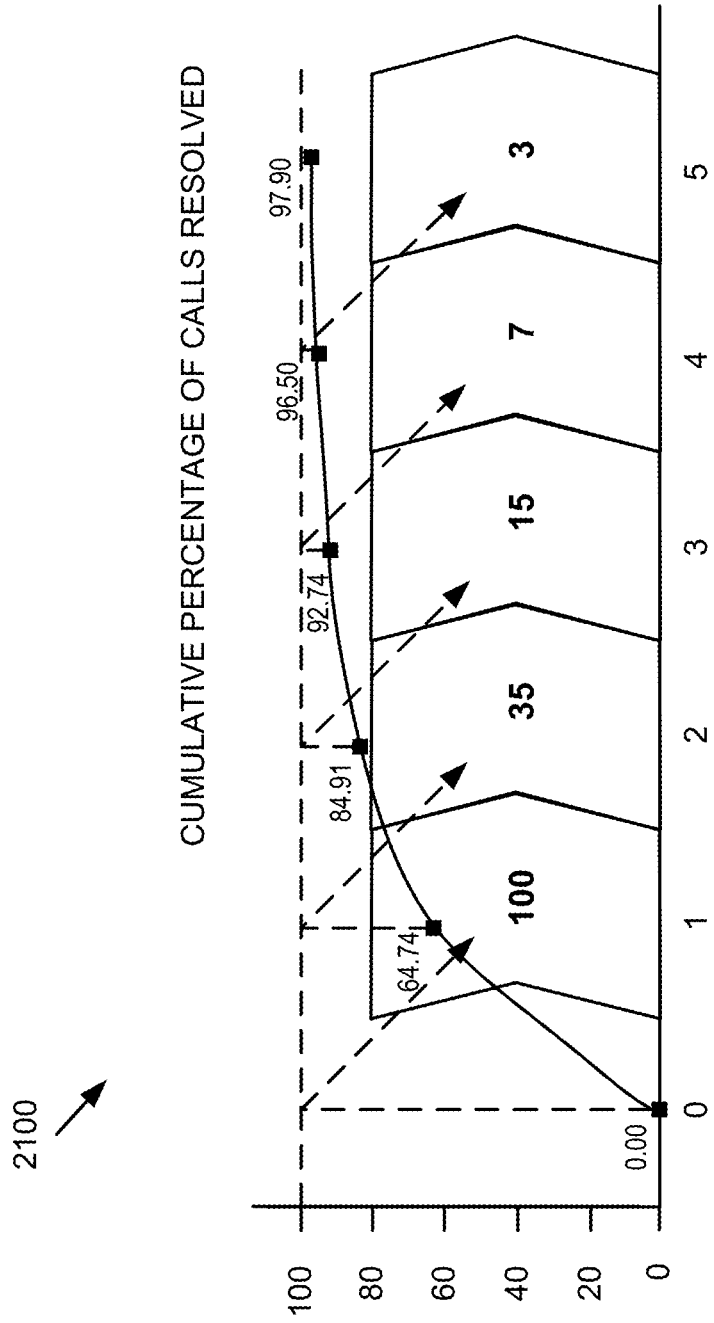
FIG. 21 shows a graph of cumulative percentage of calls resolved.
Figure 22:
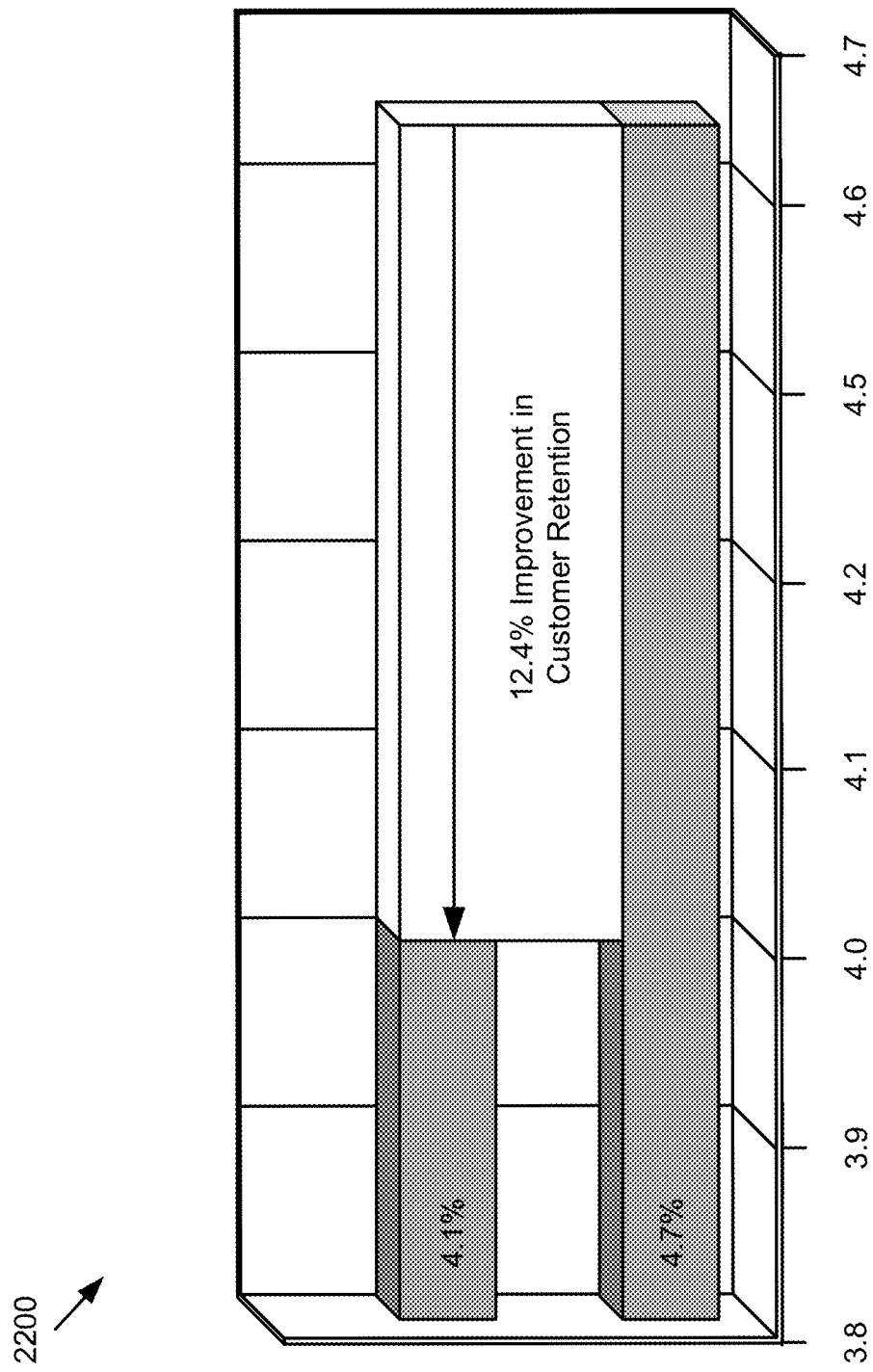
FIG. 22 shows a graphical report of churn analysis results from an implementation of a churn analysis system.

FIGS. 20-22 show exemplary churn analysis results from the churn analysis system. FIG. 20 shows a graph 2000, indicating a negative linear correlation with the number of inbound interactions or contacts per block. FIG. 21 shows a graph 2100, representing a cumulative percentage of calls resolved. FIG. 22 shows a graph 2200, indicating an improvement in customer retention after implementation of a customer retention initiative.

Figure 23:
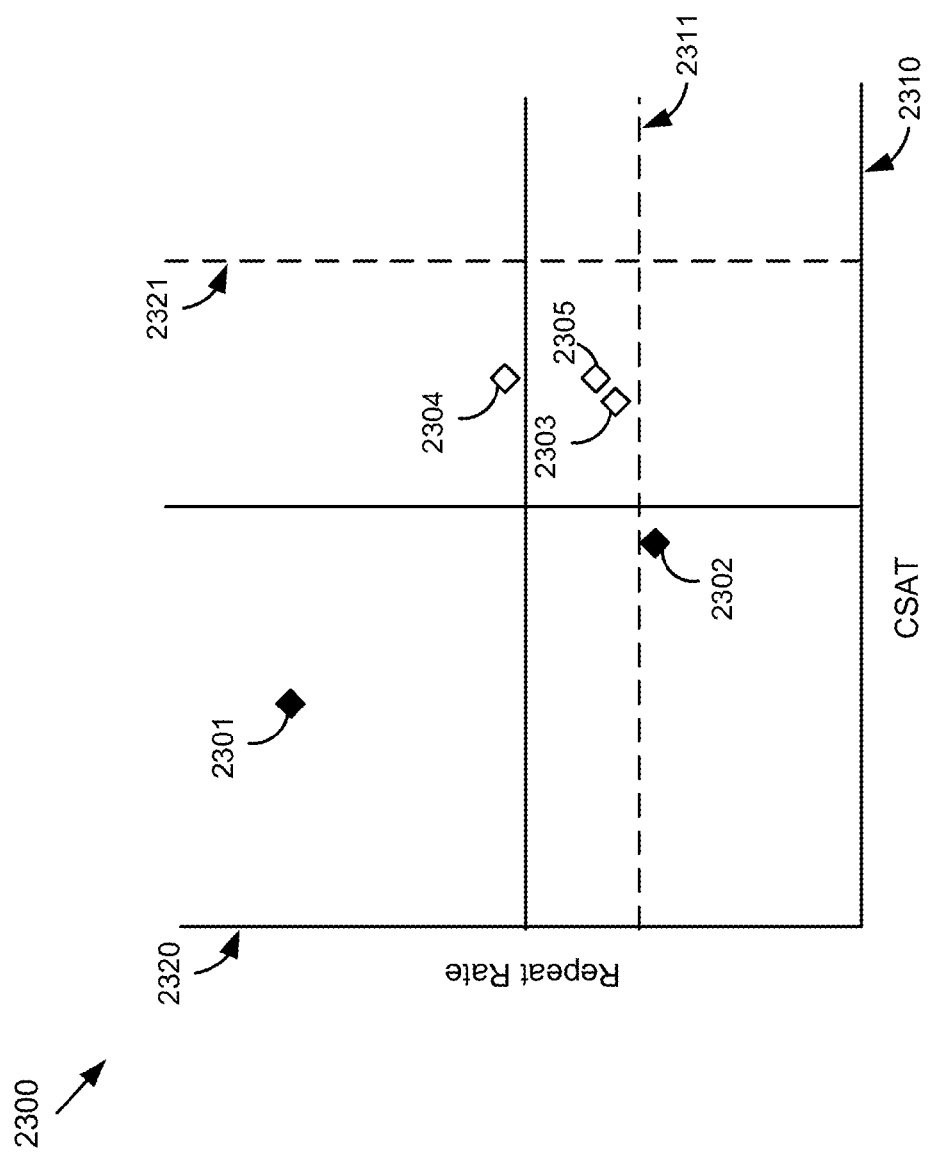
FIG. 23 shows a graph for determining correlations between problem codes and repeat calls.

In another exemplary implementation, the system may perform Repeat Calls and Dispatch Analysis. FIG. 23 shows an exemplary graph 2300 which the system may generate or provide for determining a correlation between interaction problem codes and customer satisfaction level and repeat call rates. Horizontal axis 2310 represents a customer satisfaction level, increasing from left to right. Line 2311 indicates a service provider's Network repeat call rate. Vertical axis 2320 represents a repeat call rate, increasing from bottom upwards. Line 2321 indicates the service provider's target customer satisfaction level. The points in the graph 2300 represent different problem codes, 2301, 2302, 2303, 2304 and 2305, and the location of the points indicate the repeat call rate and customer satisfaction level associated with each problem codes. For example, the graph 2300 indicates that problem code 2302 is associated with a repeat call rate that is slightly below the network repeat call rate, but also associated with a customer satisfaction level that is significantly below the target customer satisfaction level. Problem code 2301 is associated with the highest repeat call rate out of all five problem codes, and also the lowest customer satisfaction level.

Displaying data from a USAR in a graph 2300 may help identify large scale inefficiencies with dispatch processes and associated repeat calls, revealing large, negative impacts on the customer experience. A main analysis may show a disproportionate number of repeat calls associated with a particular approach to resolving customers' problems. An analysis of customer satisfaction surveys may show significant disconnect between contact centers and field organizations, and overall poor performance in a number of key indicators, such as repeat rate. A time-series analysis performed with external data may reveal a majority of repeat calls on the day of a scheduled dispatch, mostly resulting in missed appointments, and inflexibility of scheduling from a customer perspective. These analyses may identify significant savings in decreasing repeat minutes (minutes spent on repeat interactions), which may result in a dedicated Transformation work stream with various process and technology changes to realize internal and external savings to the call center and customer care enterprise at-large from repeat minutes and nonproductive dispatches.

Figure 24:
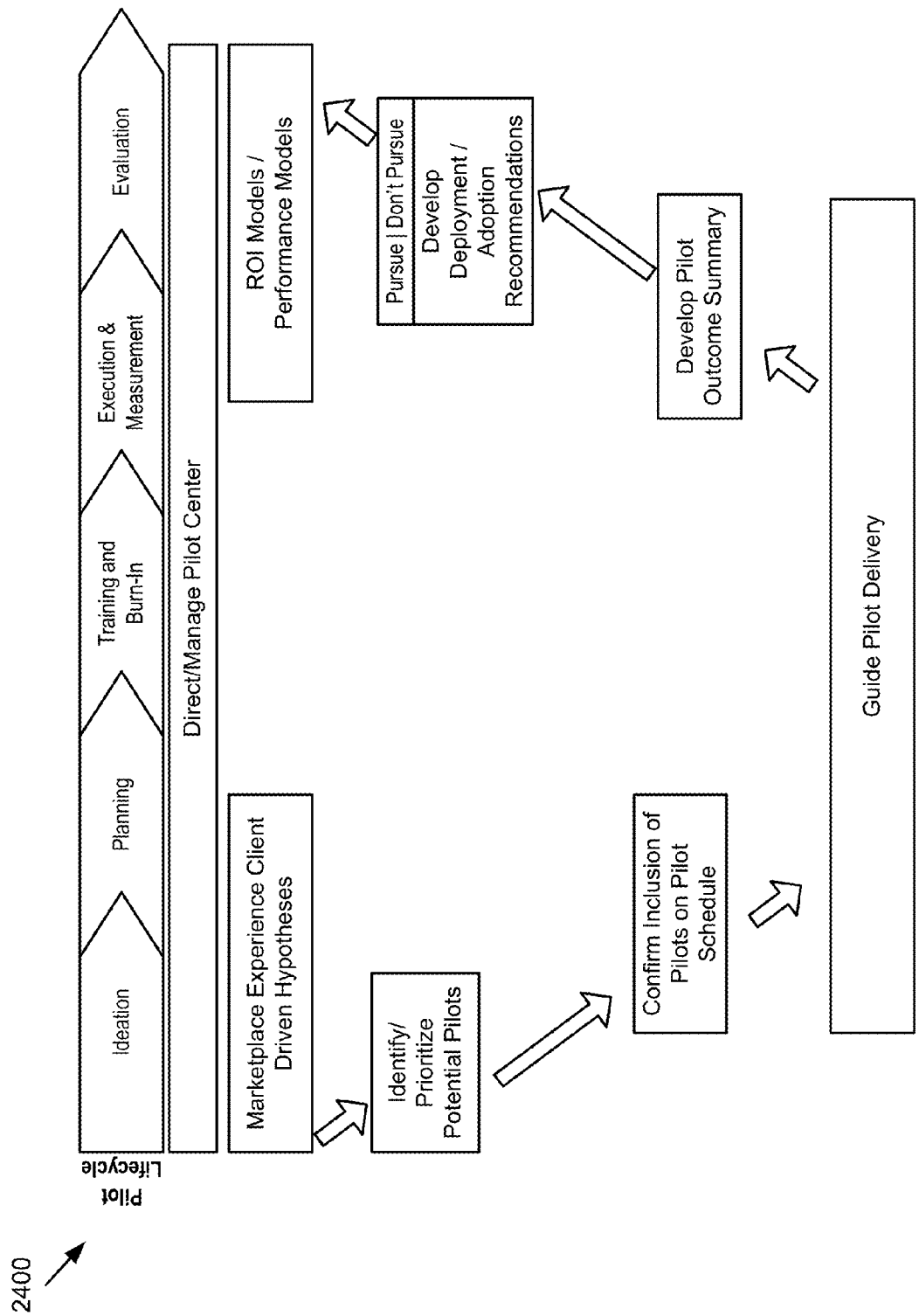
FIG. 24 shows a process pilot study of a process related to call handling and troubleshooting.

The churn analysis system 130 may also be implemented, for example, in a Process Pilot Study 2400, as shown in FIG. 24, of an Agent Process Call Flow Study. The system may track, report, and evaluate all processes related to call handling and troubleshooting. The USAR may track agent data and evaluate agent performance between test and control groups. Through analysis, targeted and specific agent segments may be identified for which pilot processes are more effective in terms of Average Handling Time, First Call Resolution, Average Minutes Per Resolution, & Customer Satisfaction. The system may complete an analysis of variance for each process based on core KPIs. The system may analyze KPIs by problem code to determine call drivers that contribute most to the overall metrics impact. The system may provide recommendations on identifying drivers where a pilot process should be adhered to strictly, and those drivers where strict adherence should not be required. The system may present to the user a full analytical review including a number of submitted process changes, and the user may determine, based on the analysis presented, which changes to implement.

The systems and methods disclosed may also be implemented, for example, in an analysis and transformation effort on email issues into tech support to quantify customer pain in the email issue and handling experience for an ISP. The USAR may track and enumerate repeat call rates and service induced churn. The system may determine whether email problem codes generate a high number of repeat minutes (when the first call did not solve the issue) which result in high costs to the service provider. The system may compare the propensity to churn for chronic email callers with the propensity to churn for non-chronic email callers. Based on that comparison, the system may make recommend a solution, such as a remote email task force within tech support to deliver specialized skills on email issues to customers.

Figure 25:
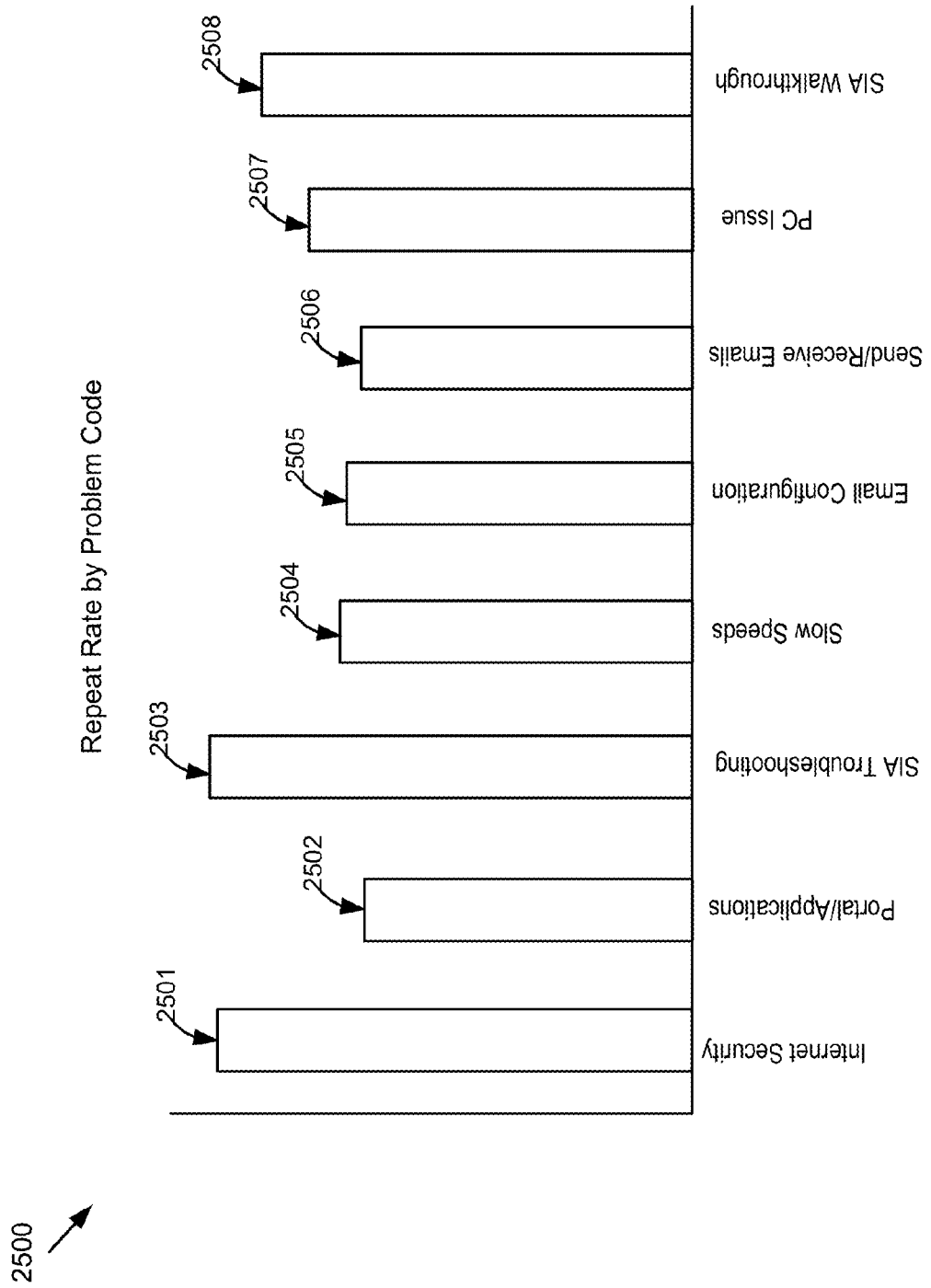
FIG. 25 shows a graph for tracking repeat rates by problem codes.

FIG. 25 shows an exemplary graph 2500 for tracking repeat rates by problem codes. Common issues experienced by customers may include issues associated with, for example: internet security 2501, portal/applications 2502, SIA Troubleshooting 2503, slow speeds 2504, email configuration 2505, sending and receiving emails 2506, hardware or PC 2507, or SIA Walk-Thru 2508.

Figure 26:
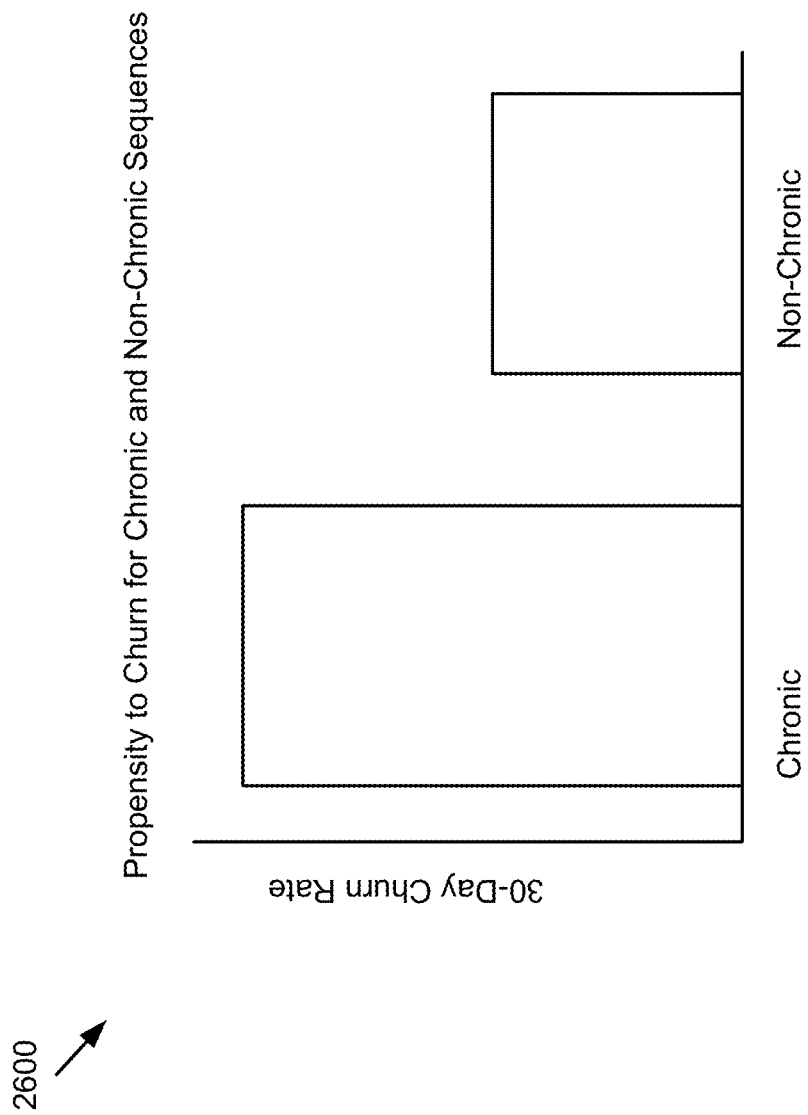
FIG. 26 shows a graph for comparing propensity to churn for chronic and non-chronic email callers.

FIG. 26 shows an exemplary graph 2600 for comparing propensity to churn for chronic and non-chronic email callers. In this example, the 30-day churn rate for chronic email callers is nearly twice as high as the churn rate for non-chronic email callers. The system may further identify root causes of email problem. Transformation teams may use the identified root causes to develop consistent, standardized solutions to solve a customer's issue on a first contact. The system may also provide ongoing tracking to ensure quick resolution of issues and individual tech support metrics, driving both lower handle times, increased first contact resolution, and lower churn rates in subgroups.

The following table shows metrics that the system may use to monitor customer experience and effectiveness of pilots. The system may process fewer, additional, or alternative metrics in other implementations.

| Table of USAR Metrics for Monitoring Performance | |
|---|---|
| Entity | Description |
| # of Agents/Reps per Tenure | The total amount of agents/reps that fall into a specific range of tenure, tenure defined as the tenure of the agent at the time of a given interaction |
| # Repeat Contacts | Number of contacts that are repeats by problem code. |
| % of Contact Volume | The percent of the total call volume by problem code. |
| % of Repeat Contact Volume | The percentage of total calls that are repeats by problem code. |
| % Repeat Contact Volume | The percentage of repeat minutes from the total minute volume for each problem code. |
| Δ AHT (Average Handling Time) | The percentage differential in AHT from one time period to another |
| Δ AMPR (Average Minutes Per Resolution) | The percentage differential in AMPR from one time period to another |
| Δ CSAT (Customer Satisfaction) | The percentage differential in CSAT from one time period to another |
| Δ CSL (Chronic Service Level) | The percentage differential in CSL from one time period to another |
| Δ FCR (First Contact Resolution) | The percentage differential in FCR from the previous time period to the current month |
| Δ RR (Resolve Rate/Fix Rate) | The percentage differential in RR from one time period to another |
| ACW (After Call Work) | The amount of time it takes the Agent to perform After Call Work for the interaction. |
| Average Handle Time (AHT) | AHT is calculated by the sum of Talk Time, Hold Time, and After Call Work Time divided by the # Total Interactions |
| Average Minutes per Resolution (AMPR) | AMPR is calculated by the Total Handle Time divided by the # of Total Resolutions for all contacts |
| Contact Volume | The total number of calls received for all interactions by problem code. |
| Chronic Service Level (CSL) | CSL is calculated by the # of Chronic Originating Interactions divided by the # of Total Interactions for inbound contacts only. |
| Contacts per Resolution | Contacts per Resolution is the number of calls in a call sequence with a firm resolution |
| CSAT Gap | The difference between the CSAT average score and CSAT Target |
| CSAT Target | Business/Operations defined customer satisfaction score or target |
| Customer Attribute (1-15) | Customer attribute such as product type, subscription type, customer type, accessories owned, or add-ons subscribed to |
| Customer Satisfaction Scores (CSAT) | The mean score from the Customer Satisfaction surveys or Custom Calculation (e.g. Top Box/Bottom Box, etc.) |
| Customer Sensitivity | Measures how inclined customers are to respond to a survey relative to its percent of total contact volume |
| First Contact Resolution (FCR) | Evaluates the agent's ability to resolve a customer's problem on the first call in 5 minutes or less. FTR is calculated by the # of Initial Contacts Resolved divided by the # of Initial Contacts for inbound calls only. |
| Hold | The amount of time the contact is placed on hold. |
| Minute Volume | The total amount of minutes for all interactions by problem code calls |
| Number of Responses | The total number of contacts that have responded to the CSAT survey (do not contain a NULL value in the Customer CSAT Score) for inbound contacts only. |
| Rank | Where the problem code scores against the other problem codes with respect to minute volume; or where the agent scores against their peers |
| Repeat Contact Volume | Number of contacts that are repeats for that problem code. |
| Repeat Minute Volume | The total amount of minutes for handled repeat contacts. |
| Resolve Rate (RR) | Evaluates the agent's ability to resolve a customer's problem on every call for inbound calls only. Resolve rate is the number of resolved calls divided by the number of total calls for inbound calls only. |
| Tenure | The average amount of time the Agent has been working within the Center at the time of the interaction. |
| Total Chronics | The total number of interactions that are chronic |
| Total Chronics by Customer Tenure by Range Field | Evaluates the total number of chronics by Customer Tenure for each Problem Code |
| TT (Talk Time) | The amount of time the Agent and customer were connected and not on hold via telephone. |

Figure 27:
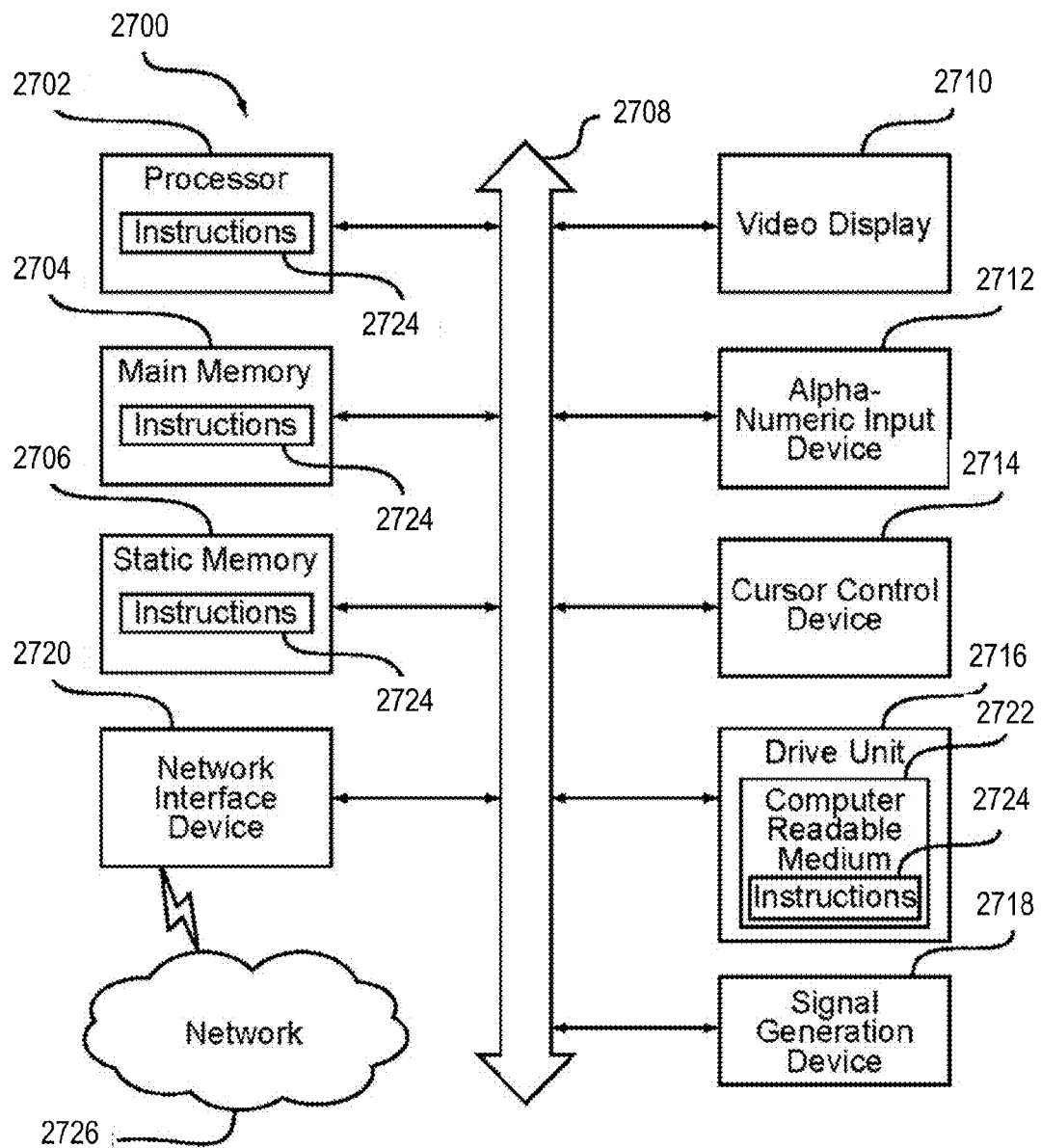
FIG. 27 shows a block diagram of a computer system that may implement a churn analysis system.

FIG. 27 is a block diagram of an exemplary computer system 2700 that may implement any of the logic and processing noted above. The computer system 2700 may include churn analysis logic, which, when executed, causes the computer system 2700 to perform any of the logic disclosed herein. The computer system 2700 may operate as a standalone device or may be connected, e.g., using a network, to other computer systems or peripheral devices. The churn analysis system 130 may be implemented through hardware, software or firmware, or any combination thereof. Alternative software implementations may include, but are not limited to, distributed processing or component/object distributed processing, parallel processing, or virtual machine processing may also be constructed to implement the tools described herein.

In a networked deployment, the computer system 2700 may operate in the capacity of a server or as a client user computer in a server-client user network environment, or as a peer computer system in a peer-to-peer (or distributed) network environment. The computer system 2700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing churn analysis logic that specifies actions to be taken by that machine. The computer system 2700 may be implemented using electronic devices that provide voice, video or data communication. The system implementation may be a single computer system 2700, or may include any collection of systems or sub-systems that individually or jointly execute a set, or multiple sets, of instructions to perform any of the churn analysis processing noted above.

The computer system 2700 may include a processor 2702, e.g., a central processing unit (CPU), a graphics processing unit (GPU), or both. A processor may be implemented as a controller, microprocessor, digital signal processor, microcontroller, application specific integrated circuit (ASIC), discrete logic, or a combination of other types of circuits or logic. Moreover, the computer system 2700 may include a main memory 2704 and a static memory 2706 that may communicate with each other via a bus 2708. The computer system 2700 may further include a display 2710, such as a liquid crystal display (LCD), an organic light emitting diode (OLED), a flat panel display, a solid state display, or a cathode ray tube (CRT). Additionally, the computer system 2700 may include an input device 2712, such as a keyboard, and a cursor control device 2714, such as a mouse. The computer system 2700 may also include a disk drive unit 2716, a signal generation device 2718, such as a speaker or remote control, and a network interface device 2720.

The disk drive unit 2716 may include a computer-readable medium 2722 in which one or more sets of instructions 2724, e.g. software, may be embedded. Further, the instructions 2724 may embody one or more of the methods or logic as described herein. In a particular embodiment, the instructions 2724 may reside completely, or at least partially, within the main memory 2704, the static memory 2706, and/or within the processor 2702 during execution by the computer system 2700. The main memory 2704 and the processor 2702 also may include computer-readable media.

In general, the churn analysis logic and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software.

The system may include additional or different logic and may be implemented in many different ways. Memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems. Although the system described here is used for churn analysis, the system may also be used to analyze, predict and optimize other values that are relevant to business strategies. For example, the system may be used to analyze operating expenses.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for analyzing customer propensity to churn, comprising:

defining a maximum contact intensity parameter that provides a decision threshold for determining how to categorize customer interactions;

accessing a database of customer interaction data that represents interactions of a customer with a service provider;

analyzing, by a computer processor in communication with the database, the customer interaction data to create a customer experience block for the customer, the customer experience block capturing, from the customer interaction data, a first contact to resolved contact interaction sequence of the customer with the service provider, where the processor creates the customer experience block by:

sorting the customer interaction data chronologically for the customer;

identifying a first specific contact interaction in the customer interaction data as the first contact interaction when a previous contact interaction in the customer interaction data exceeds the maximum contact intensity with respect to the first specific contact interaction;

assigning a start row index to the first contact interaction;

identifying a second specific contact interaction in the customer interaction data as the resolved contact interaction when a subsequent contact interaction in the customer interaction data exceeds the maximum contact intensity, the customer experience block thus created such that any selected contact interaction in the first contact to resolved contact interaction sequence is within the maximum contact intensity of an immediately preceding contact interaction in the interaction sequence, if any;

assigning a common customer identifier of the customer to each contact interaction in the first contact to resolved contact interaction sequence;

assigning an end row index to the resolved contact interaction; and assigning a block index to identify the customer experience block and to associate the first contact to resolved contact interaction sequence with the start row index and the end row index;

saving the customer experience block in a unified service analytic record where the block index distinguishes between multiple different customer experience blocks for different customers in the unified service analytic record;

determining an interaction metric that is specific to a particular customer contact interaction in the first contact to resolved contact interaction sequence;

determining a block metric derived from all customer contact interactions in the first contact to resolved contact interaction sequence;

submitting the unified service analytic record, interaction metric and block metric to a churn prediction model; and receiving a customer churn analysis result from the churn prediction model.

2. The method of claim 1, further comprising:

identifying a plurality of unresolved contact interactions in the first contact to resolved contact interaction sequence, where the unresolved contact interactions represent interactions of the customer occurring after the first contact interaction and before the resolved contact interaction, each unresolved contact interaction being within the maximum contact intensity of any immediately preceding contact interaction and any immediately subsequent contact interaction in the interaction sequence;

assigning intermediate row indices to the unresolved contact interactions, where the start row index, intermediate row indices, and end row index collectively represent a chronological order of all customer contact interactions in the interaction sequence; and associating the block index with the start row index, intermediate row indices, and end row index and any block metrics derived from all customer contacts in the interaction sequence.

3. The method of claim 1, where the maximum contact intensity comprises a time period.

4. The method of claim 1, where the customer interaction data spans multiple customer interaction channels; and where the block metric comprises a block path giving a chronological customer interaction channel sequence for the first contact to resolved contact interaction sequence.

5. The method of claim 1, where the interaction metric comprises a churn flag indicating customer churn has occurred at a predetermined period of time from a start time of the particular customer contact interaction.

6. The method of claim 1, further comprising creating the churn prediction model by:

extracting from the database of customer interaction data a set of sample customer data;

determining a plurality of sample interaction metrics and a plurality of sample block metrics from the set of sample customer data; and creating a best fit equation by performing statistical regression analysis on the set of sample customer data based on the plurality of sample interaction metrics and the plurality of sample block metrics.

7. The method of claim 4, where the customer interaction channels comprises a retail location of the service provider.

8. The method of claim 4, where an additional block metric comprises an agent count giving a total number of unique agents who interacted with the customer in the first contact to resolved contact interaction sequence.

9. The method of claim 6, where the statistical regression analysis is Cox regression analysis.

10. The method of claim 6, where the customer churn analysis result predicts a customer propensity to churn for the customer.

11. A system for analyzing customer propensity to churn, comprising:

a computer processor; and a memory in communication with the computer processor, the memory comprising churn analysis logic, which when executed by the computer processor causes the computer processor to:

define a maximum contact intensity parameter that provides a decision threshold for determining how to categorize customer interactions;

access a database of customer interaction data that represent interactions of a customer with a service provider;

create, from the customer interaction data, and store in the memory a customer experience block for the customer, the customer experience block capturing, from the customer interaction data, a first contact to resolved contact interaction sequence of the customer with the service provider, where the processor creates the customer experience block by:

sorting the customer interaction data chronologically for the Customer;

identifying a first specific contact interaction in the customer interaction data as the first contact interaction when a previous contact interaction in the customer interaction data exceeds the maximum contact intensity with respect to the first specific contact interaction;

assigning a start row index to the first contact interaction;

identifying a second specific contact interaction in the customer interaction data as the resolved contact interaction when a subsequent contact interaction in the customer interaction data exceeds the maximum contact intensity, the customer experience block thus created such that any selected contact interaction in the first contact to resolved contact interaction sequence is within the maximum contact intensity of an immediately preceding contact interaction in the interaction sequence, if any;

assigning a common customer identifier of the customer to each contact interaction in the first contact to resolved contact interaction sequence;

assigning an end row index to the resolved contact interaction; and assigning a block index to identify the customer experience block and to associate the first contact to resolved contact interaction sequence with the start row index and the end row index;

save the customer experience block in a unified service analytic record stored in the memory, where the block index distinguishes between multiple different customer experience blocks in the unified service analytic record;

determine an interaction metric that is specific to a particular customer contact interaction in the first contact to resolved contact interaction sequence;

determine a block metric derived from all customer contact interactions in the first contact to resolved contact interaction sequence;

submit the interaction metric and block metric to a churn prediction model; and receive a customer churn analysis result from the churn prediction model.

12. The system of claim 11, where the maximum contact intensity comprises a time period.

13. The system of claim 11, where the customer interaction data spans multiple customer interaction channels; and where the block metric comprises a block path giving a chronological customer interaction channel sequence for the first contact to resolved contact interaction sequence.

14. The system of claim 11, where the interaction metric comprises a churn flag indicating customer churn has occurred at a predetermined period of time from a start time of the particular customer contact interaction.

15. The system of claim 11, where the churn analysis logic further causes the computer processor to create the churn prediction model by:

extracting from the database of customer interaction data a set of sample customer data;

determining a plurality of sample interaction metrics and a plurality of sample block metrics from the set of sample customer data; and creating a best fit equation by performing statistical regression analysis on the set of sample customer data based on the plurality of sample interaction metrics and the plurality of sample block metrics.

16. The system of claim 15, where the statistical regression analysis is Cox regression analysis.

17. The system of claim 15, where the customer churn analysis result predicts a customer propensity to churn for the customer.

18. A method for analyzing customer propensity to churn, comprising:

defining a maximum contact intensity parameter that provides a decision threshold for determining how to categorize customer interactions;

accessing a database of customer interaction data that represents interactions of a plurality of customers with a service provider;

analyzing, by a computer processor in communication with the database, the customer interaction data to create a plurality of customer experience blocks for the plurality of customers, the plurality of customer experience blocks capturing, from the customer interaction data, a plurality of first contact to resolved contact interaction sequences of the customers with the service provider, where the processor creates the customer experience blocks by:

sorting the customer interaction data chronologically for each customer;

identifying, for each customer experience block, a first specific contact interaction in the customer interaction data as the first contact interaction when a previous contact interaction in the customer interaction data exceeds the maximum contact intensity with respect to the first specific contact interaction;

assigning a start row index to the first contact interaction;

identifying, for each customer experience block, a second specific contact interaction in the customer interaction data as the resolved contact interaction when a subsequent contact interaction in the customer interaction data exceeds the maximum contact intensity, each customer experience block thus created such that any selected contact interaction in a specific first contact to resolved contact interaction sequence is within the maximum contact intensity of an immediately preceding contact interaction in the specific first contact to resolved contact interaction sequence, if any;

assigning a common customer identifier of the customer to each contact interaction in the specific first contact to resolved contact interaction sequence;

assigning an end row index to the resolved contact interaction; and assigning a block index to identify the customer experience block and to associate the first contact to resolved contact interaction sequence with the start row index and the end row index;

saving the plurality of customer experience blocks in a unified service analytic record comprising block indices of the plurality of customer experience blocks, the block indices distinguishing between the plurality of customer experience blocks;

determining, from the unified service analytic record, interaction metrics specific to particular customer contact interactions in the plurality of first contact to resolved contact interaction sequences;

determining, from the unified service analytic record, block metrics derived from all customer contact interactions in the plurality of first contact to resolved contact interaction sequences;

submitting the unified service analytic record, interaction metrics and block metrics to a churn prediction model; and receiving a customer churn analysis result from the churn prediction model.

* * * * *